(12) United States Patent
Landa et al.

(10) Patent No.: US 12,386,277 B2
(45) Date of Patent: Aug. 12, 2025

(54) METHOD OF MANUFACTURING A MULTI-LAYER ARTICLE

(71) Applicant: LANDA LABS (2012) LTD., Rehovot (IL)

(72) Inventors: Benzion Landa, Nes Ziona (IL); Sagi Abramovich, Ra'anana (IL); Moshe Levanon, Rehovot (IL); Helena Chechik, Rehovot (IL)

(73) Assignee: LANDA LABS (2012) LTD., Rehovot (IL)

( * ) Notice: Subject to any disclaimer, the term of this patent is extended or adjusted under 35 U.S.C. 154(b) by 619 days.

(21) Appl. No.: 17/093,667

(22) Filed: Nov. 10, 2020

(65) Prior Publication Data

US 2021/0055666 A1    Feb. 25, 2021

Related U.S. Application Data

(63) Continuation of application No. 16/203,647, filed on Nov. 29, 2018, now Pat. No. 10,884,349, which is a
(Continued)

(30) Foreign Application Priority Data

May 30, 2016 (GB) ...................................... 1609463

(51) Int. Cl.
*G03G 7/00* (2006.01)
*B32B 5/26* (2006.01)
(Continued)

(52) U.S. Cl.
CPC .............. *G03G 7/0093* (2013.01); *B32B 5/26* (2013.01); *B32B 7/06* (2013.01); *B32B 15/14* (2013.01);
(Continued)

(58) Field of Classification Search
CPC ...... G03G 7/0093; G03G 7/0086; B32B 5/26; B32B 7/06; B32B 15/14; B32B 15/20;
(Continued)

(56) References Cited

U.S. PATENT DOCUMENTS 3,819,772 A * 6/1974 Kolobow ........... B01D 67/0013
521/61
6,020,098 A * 2/2000 Bretscher ........... G03G 5/14726
430/66
(Continued)

FOREIGN PATENT DOCUMENTS

JP     H0248936 A     2/1990
JP     2001234122 A     8/2001
(Continued)

OTHER PUBLICATIONS

Sinagra et al., "Aluminium foil: focus on the surfaces", packmedia. net webmagazine, Nov. 9, 2016 https://packmedia.net/facts-and-data/aluminium-foil-focus-surfaces. (Year: 2016).*
(Continued)

*Primary Examiner* — Christopher W Raimund
(74) *Attorney, Agent, or Firm* — Momentum IP; Marc Van Dyke

(57) ABSTRACT

There is disclosed a method of manufacturing a multi-layered article including a finished outer surface optionally having particular surface properties. The article can be a self-supported strip having a smooth outer surface. The method is, for example, suitable for the preparation of multi-layered articles such as a flexible intermediate transfer member (ITM) for use in an indirect printing system. Uses of such articles are also disclosed.

20 Claims, 3 Drawing Sheets

Related U.S. Application Data continuation-in-part of application No. PCT/IB2017/053181, filed on May 30, 2017.

(60) Provisional application No. 62/343,108, filed on May 30, 2016.

(51) Int. Cl.

| | |
|---|---|
| *B32B 7/06* | (2019.01) |
| *B32B 7/12* | (2006.01) |
| *B32B 15/14* | (2006.01) |
| *B32B 15/20* | (2006.01) |
| *B32B 25/08* | (2006.01) |
| *B32B 25/20* | (2006.01) |
| *B32B 27/18* | (2006.01) |
| *B32B 27/28* | (2006.01) |
| *B32B 27/36* | (2006.01) |
| *B32B 27/40* | (2006.01) |
| *B32B 37/24* | (2006.01) |
| *B32B 37/26* | (2006.01) |
| *B41J 2/22* | (2006.01) |

(52) U.S. Cl.
CPC .............. *B32B 15/20* (2013.01); *B32B 25/08* (2013.01); *B32B 25/20* (2013.01); *B32B 27/18* (2013.01); *B41J 2/22* (2013.01); *G03G 7/0086* (2013.01); *B32B 7/12* (2013.01); *B32B 27/281* (2013.01); *B32B 27/36* (2013.01); *B32B 27/40* (2013.01); *B32B 37/24* (2013.01); *B32B 2037/243* (2013.01); *B32B 2037/268* (2013.01); *B32B 2255/02* (2013.01); *B32B 2255/06* (2013.01); *B32B 2255/26* (2013.01); *B32B 2255/28* (2013.01); *B32B 2260/021* (2013.01); *B32B 2260/046* (2013.01); *B32B 2260/048* (2013.01); *B32B 2307/21* (2013.01); *B32B 2307/538* (2013.01); *B32B 2307/546* (2013.01); *B32B 2307/73* (2013.01); *B32B 2307/732* (2013.01); *B32B 2307/744* (2013.01); *B32B 2307/748* (2013.01); *B32B 2307/75* (2013.01); *B32B 2311/24* (2013.01); *B32B 2559/00* (2013.01)

(58) Field of Classification Search
CPC ......... B32B 25/08; B32B 25/20; B32B 27/18; B32B 7/12; B32B 27/281; B32B 27/36; B32B 27/40; B32B 37/24; B32B 2037/243; B32B 2037/268; B32B 2255/02; B32B 2255/06; B32B 2255/26; B32B 2255/28; B32B 2260/021; B32B 2260/046; B32B 2260/048; B32B 2307/21; B32B 2307/538; B32B 2307/546; B32B 2307/73; B32B 2307/732; B32B 2307/744; B32B 2307/748; B32B 2307/75; B32B 2311/24; B32B 2559/00; B41J 2/22

See application file for complete search history.

(56) References Cited

U.S. PATENT DOCUMENTS

| | | | |
|---|---|---|---|
| 6,393,226 B1* | 5/2002 | Charlebois | G03G 15/162 399/308 |
| 8,753,712 B2 | 6/2014 | Dudley et al. | |
| 10,884,349 B2* | 1/2021 | Landa | B41J 2/22 |
| 2014/0168336 A1* | 6/2014 | Mettu | B41J 2/01 347/103 |

FOREIGN PATENT DOCUMENTS

| | | | | |
|---|---|---|---|---|
| WO | 9707433 A2 | 2/1997 | | |
| WO | WO-2015036865 A1 * | 3/2015 | ........... | C09D 11/104 |

OTHER PUBLICATIONS

JP 2001234122 Machine Translation (from EPO website)—published Aug. 28, 2001.
JP H0248936 Machine Translation (from EPO website)—published Feb. 19, 1990.

* cited by examiner

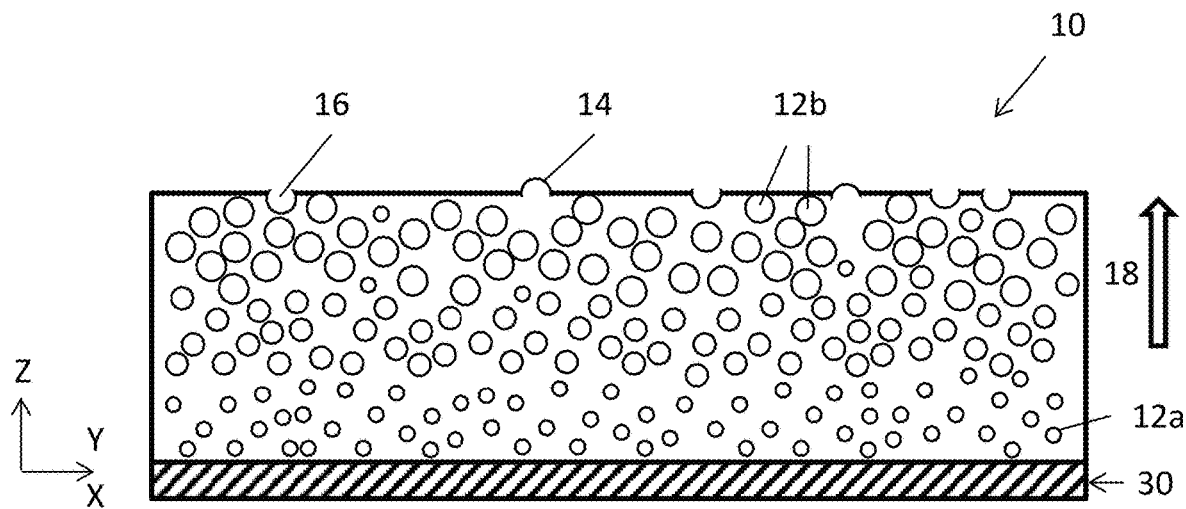
Fig. 1A – Prior Art
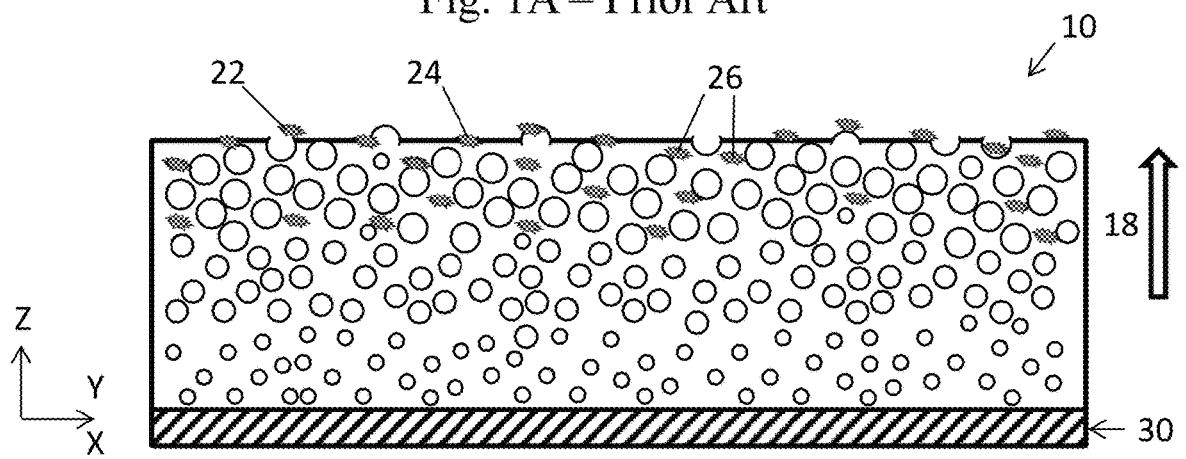
Fig. 1B – Prior Art
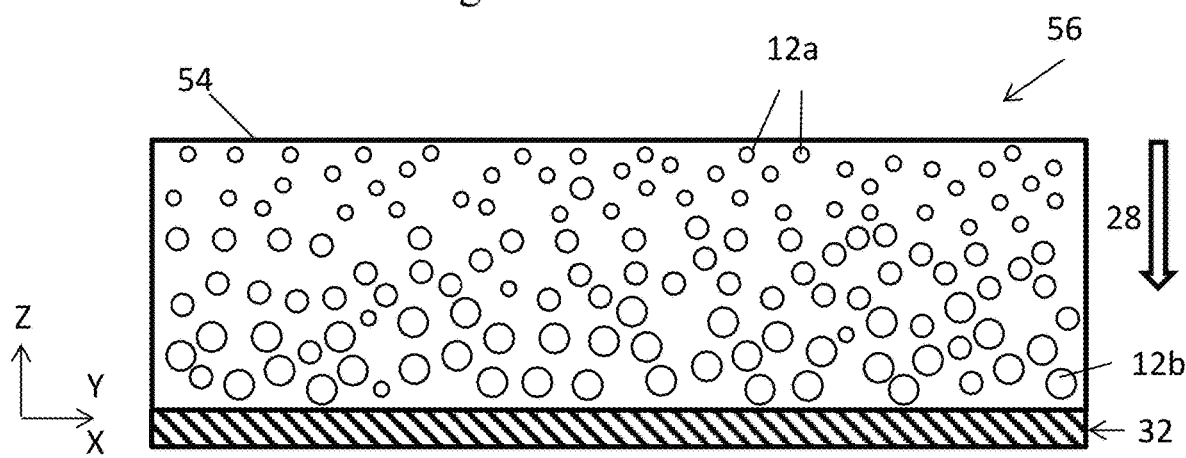
Fig. 2

METHOD OF MANUFACTURING A MULTI-LAYER ARTICLE

CROSS-REFERENCE TO RELATED APPLICATIONS

This application is a Continuation of U.S. patent application Ser. No. 16/203,647, filed on Nov. 29, 2018 which is incorporated herein by reference for all purposes as if fully set forth herein. U.S. patent application Ser. No. 16/203,647 is a Continuation-In-Part (CIP) of International Application Number PCT/IB2017/053181, filed on May 30, 2017, which claims priority from U.S. Patent Application Ser. No. 62/343,108 and from GB Patent Application Number 1609463.3, both filed on May 30, 2016. All of the aforementioned applications are incorporated by reference herein for all purposes as if fully set forth herein.

FIELD

The present disclosure relates to a method of manufacturing a multi-layered article including a finished outer surface. The method is, for example, suitable for the preparation of a flexible intermediate transfer member (ITM) for use in an indirect printing system.

BACKGROUND

Multi-layered articles are used in numerous applications. Typically, each layer predominantly contributes a particular function or characteristic to the multi-layered product. Such laminates can be either rigid (e.g., decorative tiles) or flexible (e.g., plastic laminates for packaging). Generally, manufacturing methods can attain better precision, when desired, for small articles (e.g., a printed circuit) than for larger articles in which variations or sporadic defects are expected to affect the end product to a lesser extent.

In patent publication WO 2013/132418, which is incorporated by reference for all purposes as if fully set forth herein, Landa Corporation discloses an indirect inkjet printing system. In this system, droplets of an aqueous ink, comprising an aqueous carrier in which fine particles of pigment and resin are suspended or dissolved, are deposited onto the ink transfer surface of a release layer of an intermediate transfer member (ITM) at an image-forming station. The ITM, also called a blanket, can have, in this exemplary printing system, the form of a flexible endless belt, the ink transfer surface of which is preferably hydrophobic. The ITM transports the image made-up of the ink droplets from the image-forming station towards an impression station. During the transport, all or most of the ink carrier evaporates from the ink droplets to leave a tacky film of resin and pigment that constitutes the image. At the impression station, the tacky film is pressed onto and adheres to a printing substrate, separating cleanly from the ITM on account of the hydrophobic nature of the ink transfer surface, thereby forming a printed product.

As is described in WO 2013/132418, the ITM may be required to have several specific physical properties that may be achieved by having a complex multi-layer structure. Generally, the ITM includes a support layer, typically comprising a fabric, the support layer having a very limited elasticity to avoid deformation of an image during transport to an impression station. The ITM may additionally have a highly compliant thin layer immediately beneath the release layer to enable the tacky film to closely follow the surface contour of the substrate. The ITM may include other layers to achieve the various desired frictional, thermal, and electrical properties of the ITM.

Due to a well-defined structure and shape, toughness and deformation-resistance, the support layer is used as the starting point when making an ITM. Specifically, manufacture of an ITM is done by providing a support layer to which additional desired layers are added to construct the desired multi-layer structure. Typically, the different layers of the ITM are applied as a curable fluid.

The release layer that defines the ink transfer surface of the ITM is the last, uppermost layer that is formed. We have found that the topography, contour and even surface finish of the ink transfer surface may be determined to a large extent by the contour of the surface of the penultimate layer to which the incipient release layer is applied. For this reason, it has proven difficult to manufacture an ITM having a defect-free ink transfer surface with a desired surface finish. We have found that such defects may appreciably detract, in various ways, from release layer performance, a problem particularly aggravated when significant ITM lengths and widths are desired.

SUMMARY

According to one aspect of the disclosure, there is provided a method of manufacturing a multi-layer article, being in one embodiment a self-supported strip, having an at least partially cured surface coating, the method comprising:
  a. providing a fluid first curable material configured to be at least partially cured by a curing process;
  b. providing a carrier having a carrier contact surface, said carrier contact surface being wettable by said fluid first curable material, said carrier being configured to maintain structural integrity when subject to said curing process;
  c. applying said fluid first curable material onto said carrier, said fluid first curable material wetting said carrier contact surface to form a layer of said fluid first curable material on said carrier contact surface;
  d. at least partially curing said fluid first curable material to form said at least partially cured surface coating of the self-supported strip; and
  e. securing a flexible base to, or forming a flexible base on, a surface of the at least partially cured surface coating opposite said carrier, wherein said at least partially cured surface coating together with said flexible base are peelable from said carrier, to produce said self-supported strip.

Thus, according to an aspect of the disclosure, there is provided a method of manufacturing a multi-layer self-supported article having a first outer layer defining a first outer surface of the article and a base including a support layer, the base being in contact on a first side with the first outer layer and forming on a second side a second outer surface, the method comprising:
  1. providing a carrier having a carrier contact surface having a defined finish;
  2. forming an incipient first outer layer of a fluid first curable material with one side of the first outer layer contacting the carrier contact surface; and
  3. at least partially curing the incipient outer layer of the first curable material, thereby forming an at least partially cured first outer layer, wherein the side of the at least partially cured first outer layer contacting the carrier contact surface constitutes the first outer surface of the article, and wherein the first outer layer (also referred to herein as the at least partially cured surface coating) together with the base, secured to or formed on the side distal from the carrier, are peelable from the carrier to produce the self-supported article. It should be understood that the first outer layer together with the base may be peelable from the carrier, by applying a linear peel force in any appropriate manner which causes a separation. Therefore reference herein to the first outer layer and the base being peelable from the carrier, or to peeling the first outer layer and the base from the carrier, or to separating the first outer layer and the base from the carrier, or to the first outer layer together with the base being peeled from the carrier, etc., may include embodiments where it might appear to an observer or to one who is performing the peeling that upon peeling, the carrier is being pulled away and/or vice versa embodiments where it might appear to an observer or to one who is performing the peeling that upon peeling, the first outer layer and the base are being pulled away.

In some embodiments, the first outer layer together with the base may be peeled from the carrier while the first outer layer is not fully cured, whereas in other embodiments the first outer layer together with the base may be peeled from the carrier only after the first outer layer is fully cured. In further embodiments, wherein the base is prepared by applying one or more layers of curable materials during the manufacturing of the multi-layer article, peeling can be performed when all curable layers present in the article are fully cured.

In some embodiments, the multi-layer article so prepared is a flexible multi-layer article. Though a finished object incorporating such a multi-layer article can have a variety of shapes, the article can typically be viewed as a sheet, even if in some embodiments it may be manufactured as a web. Any such article, whether flexible or not, can therefore be characterized by two predominant planar outer surfaces separated by the thickness of the article upon completion of its manufacture. As the first outer surface and the second outer surface need not be the same, in the present disclosure the term "first outer surface" refers to the side of the article prepared by curing of a desired composition while contacting a defined carrier surface.

The defined finish of the carrier contact surface, also simply referred to as the carrier contact surface finish or the carrier finish, can be any property such surfaces can assume, including, among others, surface roughness/smoothness, surface hydrophobicity/hydrophilicity, surface hygroscopicity/water saturation, surface energy, surface charge, surface polarity, and the like properties often relied upon to characterize surfaces of articles. It is believed that some such "finish properties" of the carrier can to some extent influence the corresponding finish property of the outer surface formed and at least partially cured thereon. It can be said that the finish of the outer surface, which can also be referred to as the article finish, is induced by the carrier contact surface, or otherwise at least partially mimics or reproduces the carrier contact surface finish, though such terms are not meant to say the respective finishes would be identical nor symmetrically opposite. To the extent such outer surfaces, once fully cured, are to interact with other materials (e.g., inks or treatment solutions when the outer surface is the release layer of an ITM), then the manufacturing method may additionally affect the interplay/interface between the manufactured article and the compositions or structures with which it is to be used.

Thus, according to an aspect of some embodiments of the disclosure, there is provided a method of manufacturing an intermediate transfer member (ITM) for use in an indirect printing system, the ITM having a release layer defining an outer ink-transfer surface of the ITM and a base including a support layer, the base being in contact with the release layer, the method comprising:

1. providing a carrier having a carrier contact surface;
2. forming a layer of a fluid first curable material with one side of the layer contacting the carrier contact surface, the layer constituting an incipient release layer; and
3. at least partially curing the incipient release layer of the first curable material, thereby forming an at least partially cured release layer of the ITM, wherein the side of the at least partially cured release layer contacting the carrier contact surface constitutes the ink-transfer surface of the ITM, and wherein the release layer together with the base, secured to or formed on the side distal from the carrier, are peelable from the carrier to produce the ITM.

Reference herein to peelable, peeling, separating, etc. in the context of the release layer may include embodiments where it might appear to an observer or to one who is performing the peeling that upon peeling, the carrier is being pulled away and/or vice versa embodiments where it might appear to an observer or to one who is performing the peeling that upon peeling, the release layer and the base are being pulled away.

Though in the following, a system in which an article prepared by the method herein disclosed is exemplified by an indirect printing system in which the multi-layered article manufactured according to the present teachings is an ITM upon which liquid inks can be deposited, this need not be construed as limiting. For instance, the ink need not necessarily be liquid (e.g., it can also be a paste, a solid etc.), its coloring agents need not be exclusively pigments or dyes (e.g., they can alternatively be inorganic materials such as metals, ceramics, micas and the like providing any desired effect) and such variations readily apparent to the skilled persons. Thus the term "ink-transfer surface of the ITM" and its variants, which relates to the outermost surface of the multi-layered article upon which a material can be deposited before being transferred to a second surface, is to be understood in its broadest applicable meaning.

As used herein, the term "base" refers to all the layers of the multi-layer article excluding the first outer layer, for instance, all the layers of an ITM excluding the release layer. The base, among other functions, supports the release layer of the ITM. In some embodiments, the base consists of a single layer, serving as a support layer, which can optionally serve additional functions, and may typically include, or consist of, a fabric.

In some embodiments, the base comprises at least two layers. As the article includes a release layer and a base, which in turn may consist of more than one layer, the article is said to be a "multi-layer" or "multi-layered" article.

In some embodiments, the method further includes, subsequently to '3', attaching a base to the side of the at least partially cured first outer layer distal from the carrier contact surface. The base can be a pre-prepared or pre-assembled structure only requiring attachment of one of its sides to the back side of the first outer layer, namely to the side of the first outer layer opposite the first outer surface, prepared as above-described. Typically, the opposite side of the base, not being attached, ultimately constitutes the second outer surface of the completed article. When the base is separately pre-prepared or pre-assembled, such second outer surface of the completed article can be prepared by the method herein disclosed. Alternatively, the base can be formed upon the first outer layer (on the side distal from the carrier contact surface), in a manner that shall be described in more detail hereinbelow.

The bi-layer or multi-layer strip (comprising the first outer layer and the base) on the carrier, forms a self-supported strip, peelable from the carrier. In other words, the carrier and the bi-layer or multi-layer strip may be detached from one another by peeling, without damaging the structural integrity of the strip, and preferably without interfering with the structural integrity of the carrier. Furthermore, even being separated from the carrier, the self-supported multi-layer strip maintains structural integrity as a contiguous article, independent of a supporting agent.

Collectively referring to the attachment to or formation of the base on the back side of first outer surface as "step '4'", independently of the number of sub-layers the base may comprise and the exact sub-steps involved, then in some embodiments the method further comprises, subsequently to '3' and/or '4', finishing the manufacture of the article or ITM without separating the first outer layer or release layer from the carrier.

In some embodiments, the method further comprises, subsequently to '3' and/or '4', packaging the article or ITM without separating the first outer layer or release layer from the carrier so that the carrier serves as a protective layer for the first outer surface or ink-transfer surface during transport.

In some embodiments, the method further comprises, subsequently to '3' and/or '4', "post-curing", (i.e. completing any prior partial curing of any curable materials so as to yield fully cured layers) the first outer layer (or the release layer) and/or the article (or ITM), as the case may be, with or without separating the first outer layer or release layer from the carrier.

In some embodiments, the multi-layer article is stored after manufacturing, and, when applicable, shipped, with the carrier as a protective layer, whereas the self-supported strip and the carrier are separated as described above just prior to use. In some embodiments, the self-supported multi-layer strip and the carrier are separated at the manufacturing site following manufacturing. In some of such embodiments, a protective film can be subsequently applied to the self-supported strip, replacing the carrier, if so desired.

Unless explicitly stated otherwise, any two steps set out herein may be carried out in any order that allows the teachings to be implemented.

According to another aspect of the disclosure, there is provided a method of mounting an intermediate transfer member (ITM) on, or into, an indirect printer, the method comprising:
  providing an ITM with or without a carrier, the ITM being
    a self-supported strip manufactured by a process including:
      a. providing a fluid first curable material configured to be at least partially cured by a curing process,
      b. providing the carrier having a carrier contact surface, said carrier contact surface being wettable by said fluid first curable material, said carrier being configured to maintain structural integrity when subject to said curing process,
      c. forming a layer of said fluid first curable material on said carrier contact surface, with one side of said layer contacting said carrier contact surface, by applying said fluid first curable material onto said carrier, so that said fluid first curable material wets said carrier contact surface,
      d. at least partially curing said fluid first curable material to form said release layer of the self-supported strip, and
      e. securing a flexible base to, or forming a flexible base on, a surface of the release layer opposite said carrier, wherein said release layer together with said flexible base are peelable from said carrier, to produce said self-supported strip;
  mounting said ITM with or without the carrier, on or into an indirect printer, wherein said release layer is fully cured prior to said mounting; and
  prior to or subsequent to said mounting, separating said carrier from said release layer.

According to an aspect of some embodiments of the disclosure herein, there is also provided a method of mounting an intermediate transfer member (ITM) on, or into, an indirect printer, comprising:
  providing an ITM prepared as described herein while the release layer is still in contact with the carrier;
  mounting the provided ITM on, or into, an indirect printer; and
  subsequently to the mounting, separating the carrier from the release layer.

According to an aspect of some embodiments of the disclosure herein, there is also provided a method of mounting an intermediate transfer member (ITM) on, or into, an indirect printer, comprising:
  providing an ITM prepared as described herein while the release layer is still in contact with the carrier;
  separating the carrier from the release layer; and
  subsequently to the separating, mounting the provided ITM on, or into, an indirect printer.

According to some embodiments, said mounting is optionally performed within 1 hour from separating the carrier from the release layer. Additionally or alternatively, a protective film, replacing the carrier, may be attached to the release layer subsequent to said separating and prior to said mounting. Such a protective film may then be separated from the release layer either prior or after said mounting.

According to an aspect of some embodiments of the disclosure herein, there is also provided a multi-layer article, in particular, an ITM, manufactured as described herein.

According to a further aspect of the disclosure, there is provided a multi-layer article, being in one embodiment a self-supported strip, the article or self-supported strip comprising a fully cured surface coating and a flexible base, wherein said fully cured surface coating in said article or self-supported strip is characterized by at least one of the following structural features:
  a decreasing defect density from a side of the fully cured surface coating which faces the flexible base to an opposite side of the fully cured surface coating;
  an average roughness of at most 250 nm on the opposite side; and
  a presence of defects, if any, on less than one percent of an area of the opposite side, after cleaning the opposite side.

In the description and claims of the present disclosure, each of the verbs "comprise", "include" and "have", and conjugates thereof, are used to indicate that the object or objects of the verb are not necessarily a complete listing of features, members, steps, components, elements or parts of the subject or subjects of the verb.

As used herein, the singular form "a", "an" and "the" include plural references and mean "at least one" or "one or more" unless the context clearly dictates otherwise.

As used herein, unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended, or within variations expected from the measurement being performed and/or from the measuring instrument being used. When a numerical value is preceded by the term "about", the term "about" is intended to indicate +/−10%, +/−5%, or even only +/−1%, and in some instances the precise value.

BRIEF DESCRIPTION OF THE DRAWINGS

Some embodiments of the invention are described herein with reference to the accompanying figures. The description, together with the figures, makes apparent to a person having ordinary skill in the art how some embodiments of the disclosure may be practiced. The figures are for the purpose of illustrative discussion and no attempt is made to show structural details of an embodiment in more detail than is necessary for a fundamental understanding of the disclosure. For the sake of clarity, some objects depicted in the figures are not to scale.

In the Figures:

FIGS. 1A and 1B schematically illustrate a cross section through a release layer prepared according to the prior art;

FIG. 2 schematically illustrates a cross section through a release layer prepared according to the present method;

DETAILED DESCRIPTION

Figure 3:
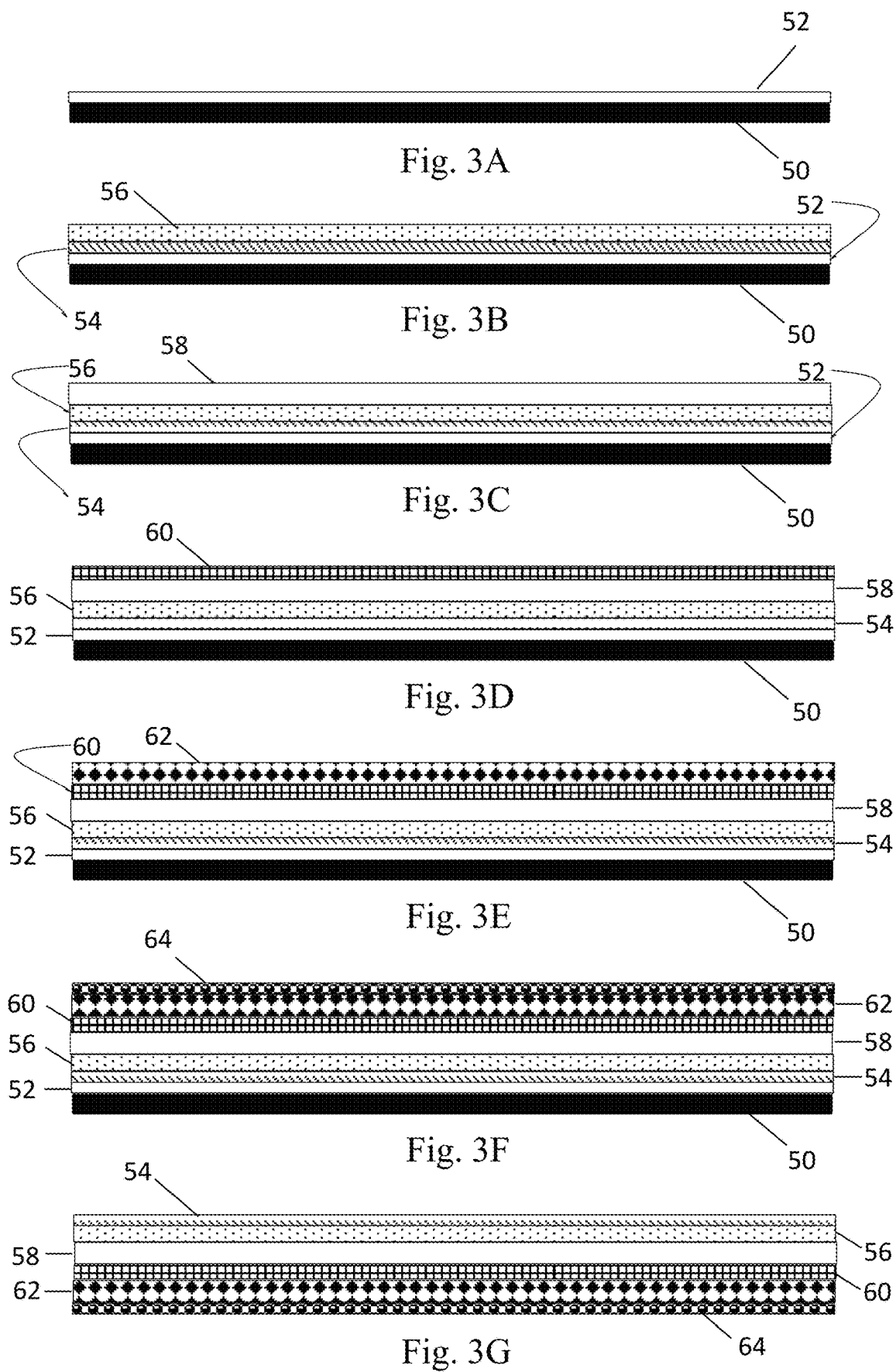
FIG. 3A schematically shows a section through a carrier.
FIGS. 3B to 3F schematically exhibit different stages in the manufacture of an ITM, according to one aspect of the inventive method.
FIG. 3G is a section through a finished ITM after installation in a printing system.

There is provided in accordance with an aspect of the present disclosure a method of manufacturing a multi-layered article having a finished outer surface, such an article, when flexible, being suitable as an intermediate transfer member (ITM) for use in an indirect printing system. In some embodiments, the finished outer surface provides some advantages relative to the art.

Though in the following, an ITM will be described in more detail, it is understood that the method herein disclosed is suitable for the preparation of a wide range of multi-layered articles, in particular, flexible multi-layered articles. The ITM is therefore to be construed as a non-limiting example.

In the art, a support layer of an ITM is used as a physically robust support structure onto which other ITM layers are added until the ITM is complete. A layer of fluid curable material, constituting an incipient release layer, is formed as the uppermost layer on top of previous layers, wherein the outer surface of the formed release layer comprises an ink transfer surface. As a result, the finish of the ink transfer surface is at least partially determined by the underlying layers, and is therefore susceptible to various faults.

Moreover, since the release layer is the uppermost layer, air bubbles may be disposed at or near the ink transfer surface, leading to surface defects. Vibrations occurring while the curable material is still fluid during the curing may cause ripples that eventually set, yielding an uneven ink-transfer surface. Dust, dirt and other debris may settle on and adhere to the incipient ink transfer surface, disadvantageously yielding uncontrolled, heterogeneous surface properties that differ from the intended or designed surface properties.

FIGS. 1A and 1B schematically illustrate how some such defects would appear in a section of an outer layer 10 (e.g., a release layer) prepared according to an aforementioned method of the art. FIG. 1A illustrates different phenomena relating to air bubbles that can be entrapped in any curable composition if the curing occurs before such bubbles can be eliminated (e.g., by degassing). During conventional manufacturing of layer 10 over a body 30, the orientation of the structure is as shown by arrow 18, the upper section of the drawing being at the air interface. As can be seen in the figure, as tiny bubbles 12a migrate towards the air interface, they can merge into larger bubbles 12b. The bubbles 12a and 12b, of various sizes, may either remain entrapped within the bulk of the layer or on its surface, the upper part of the trapped bubbles envelope forming protrusions 14. When bubbles adjacent to the surface burst while the curing of the layer is advanced, craters or cavities 16 may remain, even if the segment of the envelope of the bubbles protruding from the surface has disappeared. These phenomena therefore typically provide a "gradient" of the distribution of air bubbles, the upper sections being generally either populated by larger bubbles than those of the lower sections and/or having a higher density of bubbles per cross section area or per volume, lower and higher being relative to the orientation of the layer during its manufacturing. The impact of bubbles-derived defects on the surface is self-evident, the heterogeneity of the surface typically negatively affecting any subsequent interactions, for instance with an ink image. With time, such an ITM being typically operated under tension and/or under pressure, craters may widen and merge to form more significant craters (e.g. fissures). Thus, such phenomena may affect the structural integrity of the surface and any mechanical property such integrity would have conferred to the ITM.

FIG. 1B schematically illustrates phenomena relating to solid contaminants, such as dust, dirt, and/or other debris. Although the dust is represented as being in addition to air bubbles, this need not be the case, as each such surface or layer defect may be formed independently. As can be seen, solid contaminants 22 may remain upon the surface. If the settling of contaminants occurs after the outer layer 10 has been fully cured, then such contaminants 22 may be removed by suitable cleaning of the outer surface. Still, such a phenomenon is not desired, as it would require additional processing of such an ITM prior to use. Moreover, if such contaminations occur while the layer is still uncured, then the contaminants can be either entrapped on the surface of layer 10 (see for example contaminant particle 24, which is seemingly floating), or can even be submerged within the release layer, (e.g., contaminant particle 26). As can be readily understood, larger/heavier contaminants may sink more than smaller/lighter ones.

It is easily understood that the presence of such defects in or on a cured layer due to serve as an ink or ink-image transfer surface in an ITM of a printing system may negatively affect the quality of the ink image that may form on the ITM and/or that may transfer to a printing substrate. For instance, the presence of defects may reduce the regularity of the ink image deposited on the surface, thus its consistency with the intended image. As the release property of the surface may also diminish as a result of such imperfections, the transferred image may further differ from the intended one.

Moreover, it will be readily understood that while such a problem of surface defects might conceivably be circumvented if the final article can be cut from sporadic "defect-free" regions of a relevant multi-layered supply, such possible selection becomes less and less probable, as the size of the final article increases, whether in absolute terms, or with respect to the surface area of the source, or both. In some embodiments, the substantially defect-free final article, which may optionally be selected within regions of a self-supported multi-layer article according to the present teaching, has a surface area of at least 1 m$^2$, at least 2 m$^2$, at least 5 m$^2$, at least 10 m$^2$, at least 15 m$^2$, or at least 20 m$^2$. In some embodiments, the surface area of a self-supported multi-layer having a substantially defect-free surface coating is of at most 150 m$^2$, at most 125 m$^2$, at most 100 m$^2$, at most 75 m$^2$, or at most 50 m$^2$.

Unlike methods known in the art, the method disclosed herein comprises forming a layer of a fluid first curable material with one side of the layer contacting a carrier contact surface of a carrier, the layer constituting an incipient release layer. The carrier contact surface functions to protect the incipient release layer, giving this layer, which acts in operation of an ITM during printing as the ink transfer layer desired properties, while the carrier acts as a physically robust support structure onto which other layers are possibly added to form the ITM, until the ITM is complete. As a result, many potential sources of defects are avoided. Moreover, the finish of the ink transfer surface is determined primarily, if not exclusively, by the carrier contact surface.

FIG. 2 schematically illustrates a section through an outer layer 56 (e.g., a release layer) prepared according to the inventive method. To facilitate comparison with previous drawings, the section is shown without a carrier and in the same orientation as FIGS. 1A and 1B, though the manufacturing is performed in inversed orientation as shown by arrow 28. The base 32, which shall be described in further detail hereinafter, is attached to the first outer layer 56 after layer 56 has been at least partially cured. Hence, base 32 is not equivalent to body 30, which already serves as a support during the manufacturing process. For the sole sake of illustration, layer 56 is represented as including a considerable number of bubbles 12, but this need not be the case. However, when present to any appreciable degree, such bubbles may display a distinct pattern with respect to those previously described. First, as the now uppermost surface 54 (e.g., an ink transfer surface) of layer 56 was previously formed in contact with a carrier, no protrusions can be observed, the release layer being therefore devoid of phenomena such as surface protruding bubbles 14 (see FIG. 1A). Likewise, the presence of such craters previously illustrated as craters or cavities 16 is very unlikely, as this would imply the use of an incompatible curable layer and carrier. As according to the present method, the curable material due to form the outer layer is to suitably wet the carrier, it is believed that substantially no air bubbles can be entrapped between the carrier and the incipient layer formed thereon. Thus, if at all present, bubbles would be disposed in the bulk of the layer. However, as the manufacturing is performed in inverted orientation as compared to conventional methods, the gradient of bubbles would, for the same reason, be inverted. Thus, from a statistical standpoint (and as depicted in FIG. 2), smaller bubbles 12a would be disposed closer to the outer surface 54 than larger bubbles 12b, which would be disposed closer to the base 32.

Certain techniques for detecting defects may be performed while the layer is at least partially cured (e.g., contact-less methods). Other techniques are preferably performed only once the layer is fully cured, for example techniques whose results may vary depending on the extent of curing that has been completed for the layer or that require preparation of samples facilitated by full curing.

A gradient of defects (e.g., protrusions and/or craters caused by bubbles, and/or defects caused by contaminants) across a layer can be detected by microscopy along the thickness of a cross section of the layer or article including it. Such techniques, which may use Focused Ion Beam (FIB) microscopy, Scanning Electron Microscopy (SEM), and Light Microscopy (LM), are known to the skilled person and need not be detailed herein. Analysis of images captured by such techniques, which can be automated by suitable computer programs, may be indicative of the orientation of a layer, with respect to air interface, during its manufacturing. Such techniques may also differentiate between defects caused by bubbles and defects caused by contaminants. In a layer prepared according to the present teachings, an increasing number and/or volume of defects might be detected away from the surface of the layer which contacted the carrier. Thus, the density of defects per unit area or unit volume is higher towards the surface proximal to the base than in the vicinity of the surface which contacted the carrier.

The amount of protrusions or craters caused by bubbles, or pin holes, orange peel, fissures, surface discontinuities and other like surface flaws on the outer surface of the article has been found to be relatively low, or even substantially nil, on at least partially cured surfaces which contacted a carrier as herein taught, as compared to outer surfaces cured while conventionally exposed to air. The presence of such defects on the outer surface (e.g., on an ink-transfer surface when the multi-layer article is an ITM) can be detected, for instance, by applying on the surface a thin coat of a liquid including a dye that provides a sufficient contrast with the background color of the article. The liquid can be applied, for example, with a doctor blade or any other instrument capable of wiping off excess liquid from protrusion-free or crater-free areas, the remaining dye therefore being largely concentrated at the locations of the defects (e.g., bubble-generated craters) on the surface. The liquid on the surface is then dried Images of the dyed surface can be captured by any suitable optical instrument (e.g., camera, scan etc.) and analyzed (e.g., by differential optical density) for the presence of dyed spots or any other anomaly indicative of a bubble related defect. The number, intensity and/or area of such spots (including cumulative intensity or area over a predetermined region of the surface under study, for instance over a square meter) can be indicative of the quality of manufacturing, and in the present case can also be indicative of the method of manufacturing. Fluorescent dyes can conveniently be used and detected under suitable lighting conditions.

Regardless of the type of defects being considered, the method of detection and/or analysis, and the sampled units (e.g., points, lines, profiles, areas or volumes, as appropriate for the relevant measurements), in some embodiments, an at least partially cured surface peeled from a carrier following manufacturing as herein disclosed would be considered substantially free of the type of defects under consideration if less than 1%, less than 0.5%, less than 0.1%, less than 0.05%, or less than 0.01% of an area of said surface, or of a portion of a cross-section through the layer including said surface and normal thereto, or of a volume including said surface, includes said type of defects.

Generally, such percentages are determined using representative samples of the at least partially cured surface and layer under study. The recommended number, area and/or volume of samples necessary to obtain values representative of an entire article or part thereof may depend upon the parameter being considered and the measurement methods being used, as readily appreciated by persons skilled in the art of such measurements. Samples may be deemed representative of an entire multi-layer article, layer and/or surface thereof when the measured values display a relatively narrow distribution from the average of all measurements (e.g., standard deviation or standard error within ±20% of the average value). Exemplary guidance concerning the number of samples to be measured, or their cumulative area, in order to obtain robust and representative results is provided below.

For instance, if measuring the number of bubble-generated defects on a surface which previously contacted a carrier, then such defects would be found in less than 1% of the measured area for the surface to be considered substantially defect-free. For illustration, for an area of 1 cm$^2$ (or 100 mm$^2$) of the surface, craters would be found on less than 1 mm$^2$, the affected area typically stemming from a number of smaller regions, even though it cannot be ruled out that the defect would span a single isolated region of the measured area. Similarly, if the presence of defects is assessed along a cross-section of the layer formed in contact with the carrier, then a substantially defect-free cross section portion of 1 cm$^2$, would include the measured defects in less than 1 mm$^2$. For avoidance of doubt, measurements made along a cross-section are typically not performed from one side of the layer to the other, but on mirroring portions of the cross-section. For instance, analysis can be performed on half of a cross section, a change in gradient being assessed by comparing the outcome of the half-portion proximal to the base, as opposed to the half-portion distal therefrom. The portions being assessed need not constitute half of the cross section and could be confined to smaller areas of the cross-section. For illustration, assuming a layer having a thickness of 100 µm, the amount of defects could be determined in the first 10 µm adjacent to the surface having contacted the carrier and in the last 10 µm which are adjacent to the opposite side of the layer.

In another instance, the surface which previously contacted the carrier, may be suitably cleaned, as disclosed herein, prior to detecting the amount of defects relating to surface contaminants. The surface may be considered substantially free of contaminant related defects if less than 1% of an area of the surface includes such defects.

Carrier Contact Surface Finish

The inventors have discovered that since the surface finish of the ink-transfer surface helps define the extent of spreading and adhesion of the ink droplets applied at the image-forming station, it may be desirable for an ink-transfer surface to have a smooth and well-defined surface finish. Moreover, such a desired, smooth and well-defined surface finish can facilitate the mechanics of transfer of the tacky film to the substrate at the impression station.

Because the first curable material forms a layer as a fluid and at least partially cures in contact with the carrier contact surface, the surface finish of the carrier contact surface may be tailored to effect, or contribute to, a desired or pre-determined surface finish of the ink-transfer surface. Accordingly, in some embodiments, the carrier contact surface has a defined surface finish, which helps provide a desired surface finish to the ink-transfer surface. For a typical ITM, an optical grade surface finish is generally desired, meaning an average roughness equal to or smaller than about a half wavelength of visible light. Thus, in some embodiments, the surface finish of the carrier contact surface is smooth, having an average roughness (Ra) of at most 250 nanometers (nm), at most 150 nm, at most 100 nm, or at most 75 nm. According to some embodiments, some polymer foils—e.g., laminated polyester films, such as polyethylene terephthalate (PET) foils, or polyimide films, such as Kapton® foils by E. I. du Pont de Nemours and Company—may be readily commercially available for use as a carrier, as is further detailed below. Such commercial foils have typical average roughness of at most 50 nm or at most 30 nm, or at most 25 nm and therefore carriers having a contact surface having such average roughness are also encompassed. According to some further embodiments, a carrier may be provided having a carrier contact surface having an average roughness of at most 20 nm, at most 15 nm, at most 12 nm, or at most 10 nm. Typically, Ra is at least 3 nm, at least 5 nm, or at least 7 nm.

As mentioned, the at least partially cured surface of the layer formed in contact with the carrier contact surface is expected to display similar roughness (e.g., within ±10%) as the carrier. For instance, considering an ITM as an exemplary multi-layer article (e.g., self-supported strip) that can be prepared according to the present teachings, the at least partially cured layer of the first fluid curable material forming an ink-transfer surface or release layer may display an average roughness (as measured following peeling of the carrier) substantially equal to the average roughness of the carrier contact surface or even lower if a "smoothening" effect is achieved by the fluid curable material. Therefore, in some embodiments, the surface finish of the layer cured at least partially while in contact with the carrier contact surface is smooth, having an average roughness (Ra) of at most 250 nm, at most 150 nm, at most 100 nm, at most 75 nm, at most 50 nm, at most 30 nm, at most 25 nm, at most 20 nm, at most 15 nm, at most 12 nm, or at most 10 nm. Typically, the average roughness Ra of such a cured layer is at least 3 nm, at least 5 nm, or at least 7 nm.

Average roughness of the carrier contact surface may be provided by the manufacturer of the carrier, or can be independently assessed.

Roughness of a surface under study (e.g., the carrier contact surface or the surface of a layer of fluid curable material cured at least partially while in contact therewith) may be measured by any appropriate technique such as interference microscopy (e.g., white light interferometry or coherence scanning interferometry, such as used in optical profilometers), confocal microscopy, scanning probe microscopy (e.g., such as atomic force microscopy (AFM), low energy electron diffraction (LEED), scanning tunneling microscopy (STM) and scanning electron microscopy (SEM)), or interference confocal microscopy. Some such surface topography measurement instrumentation advantageously allows readily sampling areas of 1 cm$^2$ or more, facilitating the assessment of roughness on a number of points along different profile lines; hence increasing the statistical significance of the measurements and the value of their average as an estimate of the average roughness of the entire surface. For methods that analyze data relating to sample points along individual lines (or profile lines), it is preferred to measure the average roughness of the surface under study along at least 5 lines, at least 10 lines, at least 15 lines, or at least 20 lines, randomly selected over said surface. The length of a line for such measurements depends on the measuring instrument being used and, for instance might be only a few micrometers (μm) for AFM and up to a few centimeters (cm) for profilometers. These lines of measurements can be selected in different regions of the surface under study, to further increase the significance of the average of the linear measurements as an estimate of the entire surface's average roughness.

For methods that analyze data relating to sample areas, it may be preferable to measure the average roughness of the surface under study over areas of at least 1 cm$^2$, at least 5 cm$^2$, at least 10 cm$^2$, or at least 20 cm$^2$. The sampled areas of measurements summing up to said areas of study can be selected in different regions of the surface under study, to further increase the significance of the average of the areal measurements as an estimate of the entire surface average roughness. For instance, 10 cm$^2$ of areal sampling of a surface can be achieved by measuring, in ten distinct regions of the surface under study, areas of 1 cm$^2$ each.

While the absolute gloss of an outer surface may be of no consequence to a multi-layer article, this parameter may assist in assessing its overall uniformity (e.g., flatness, waviness, smoothness, presence of defects, etc.). More uniform surfaces typically display higher gloss values than less uniform surfaces. For instance, roughness, protrusions, craters, dust, dirt, other debris and like surface defects may sufficiently scatter incident light so as to confer a hazy appearance to the surface. Gloss of a surface can be measured by any suitable method (e.g., using a glossmeter) and a number of standard procedures exist for various types of surfaces (e.g., ASTM D523, ASTM D2457, ISO 2813). Typically, measurements are taken on a flat and clean surface of at least 1 cm$^2$, but larger areas can readily be scanned for additional data points ensuring the sample's surface is homogeneous and a representative result is reported.

Alternatively or additionally, the carrier contact finish may include any desirable surface property, for instance any desired hydrophobicity/hydrophilicity of the carrier contact surface. A surface is said to be hydrophobic when the angle formed by the meniscus at the liquid/air/solid interface, also termed wetting angle or contact angle, exceeds 90°, the reference liquid being distilled water at room temperature (circa 23° C.). Under such conditions, which are conventionally measured with a goniometer or a drop shape analyzer and which can be assessed at any given temperature and pressure (e.g., at ambient conditions, or under conditions of relevance to the manufacturing process or to the use of the manufactured article), a water droplet tends to bead and does not wet the surface. Conversely, a surface is deemed hydrophilic when the contact angle is less than 90°, the water droplet readily spreading and wetting the surface.

It is to be noted that while contact angle measurements are typically intended to assess the hydrophobicity/hydrophilicity of a surface (be it the carrier contact surface or the surface of a layer of fluid curable material cured at least partially while in contact therewith), such measurements may also be indicative of the uniformity of such a surface. Contact angle measurements are generally performed at least at three distinct points on a surface, the results provided being the average of these measurements. Results are generally considered representative if the variation (e.g., standard deviation or standard error) between the measurements is relatively low, for instance within ±20% of the mean value). By increasing the number of points being sampled to at least 5 points, at least 10 points, or at least 15 points, or at least 20 points, the variation between the points may in itself become informative.

Regardless of the parameter being measured and the type of surface (be it the carrier contact surface or the surface of a layer of fluid curable material cured at least partially while in contact therewith), a relatively low variation (i.e. a relatively high repeatability of the measured values) may indicate that the surface providing such outcome is more uniform (e.g., smooth, flat, substantially defect-free—substantially devoid of defects on the surface (e.g., protrusions or craters caused by bubbles pin holes, orange peel or other like surface flaws, and/or defects caused by contaminants), etc.) than a surface yielding a relatively higher variation. For instance, points, lines or areas randomly sampled on a surface which can be rougher, wavier, and/or including any defect able to affect its topography may display a broader distribution. While a standard deviation (SD) or standard error (SE) of a set of measurements within ±20% of the mean value is considered satisfactory with respect to the representability of the average results, a SD and/or SE within narrower range are suggestive of a relatively high uniformity of the surface. In some embodiments, if the SD and/or SE of a property of the surface being measured are within at most ±18% of the mean value, within at most ±16% of the mean value, within at most ±14% of the mean value, within at most ±12% of the mean value, within at most ±10% of the mean value, within at most ±8% of the mean value, within at most ±6% of the mean value, or within at most ±5% of the mean value, then the SD and/or SE are suggestive of a relatively high uniformity of the surface.

It is noted however that according to aspects of some embodiments, hydrophobicity (or hydrophilicity) of the carrier contact surface as determined by a drop of water as explained above, does not predict the wettability of the carrier contact surface by a fluid other than water, as such wettability is generally determined by the difference between the surface energies of the carrier and the fluid. When the surface energy of the fluid is comparable to that of the carrier, then adequate wetting may be obtained (moreover, if the surface energy of the fluid is lower than that of the carrier, then high wetting is facilitated and/or obtained). If however the surface energy of the fluid is considerably larger than that of the carrier, then low wetting is obtained or wetting may be prevented. In conclusion, a fluid may wet a hydrophobic carrier (on which water might demonstrate beading), if the surface energy of the fluid is comparable to, or smaller than, that of the carrier. For example, most (untreated) polymers considered for the present method have a surface energy considerably lower than the surface energy of water, namely lower than about 72 mJ/m$^2$ (also equal to about 72 mN/m) and hence are not tended to be wetted by water. Some such polymers may be strictly hydrophobic. However, a drop of a fluid different from water may well wet such a polymer, if such other fluid has a surface energy lower than that of the polymer surface.

Moreover, in some embodiments, even the said difference in surface energies does not unambiguously predict the wettability of the carrier by a viscous fluid. In some such embodiments, a carrier contact surface having a relatively low surface energy may be wetted by a viscous fluid, having a considerably higher surface energy than that of the carrier contact surface. In such embodiments the viscosity depresses the beading of the fluid, and therefore facilitates the formation of a continuous, uninterrupted and unbroken contact between the fluid and the carrier contact surface. In other words, as a viscous fluid is applied to the low-surface energy surface, wetting of the surface is obtained in practice, displaying a non-equilibrium state of the fluid on the surface. Consequently, if the fluid is curable, and the fluid is cured before beading progresses to reach the steady state, then the continuous, uninterrupted and unbroken contact between the fluid and the surface may be stabilized. Thus, as used herein, the terms hydrophobicity and hydrophilicity are used to characterize a surface (e.g., the carrier contact surface or a release surface of an ITM) in the presence of a drop of water. The term wettability and its derivatives are used in a broader sense to characterize a surface (e.g., the carrier contact surface) in the presence of a fluid, not necessarily water.

The present inventors have surprisingly found that the release layer of an ITM manufactured according to the present teachings has a polarity that differs from that of a release layer prepared by methods of the art, where the outer surface faces air rather than a carrier contact surface. This unexpected phenomenon is exemplified below.

Foil Carrier

The carrier may be any suitable carrier. As discussed in greater detail below, in some preferred embodiments, the carrier is a flexible foil, i.e., a thin flexible sheet. One advantage of a foil carrier, for some embodiments, is that foils having a suitable surface finish, for example, sufficient smoothness, are readily available. Likewise, such foils may have a variety of compositions, providing a wide range of hydrophobic/hydrophilic surface properties, or any such surface properties that may serve the intended use of the article. In some embodiments, the flexible foil has a thickness of at least 10 micrometers (μm), at least 50 μm, or at least 100 μm. In some embodiments, the flexible foil has a thickness of at most 4000 μm, or of up to 2000 μm. In some embodiments, during the forming of the incipient release layer of the fluid first curable material, the carrier is supported on a continuous flat support, for example, a table or the like. In a particular embodiment that will be detailed hereinafter, the carrier is in motion during the forming of the incipient release layer and/or during the attachment or formation of the base upon the at least partially cured release layer. In such a case, the carrier may additionally be required to have mechanical properties adapted to such motion.

The finished article comprises the carrier and, attached thereon, the self-supported strip, generally comprising the release layer and the base layer. The self-supported strip is peelable from the carrier, namely the carrier and the self-supported strip may be detached from one another by peeling, without damaging the structural integrity of the strip, and optionally preferably of the carrier. Such peeling exposes the release layer of the self-supported strip, rendering the strip ready for use. It is emphasized that such peeling may, according to some embodiments, be employed as close as possible prior to using the strip. In other words, following manufacturing as herein described, the carrier with the strip attached thereto may be stored, and then shipped to be used, whereas, during the periods of said storing and shipment, the release layer of the strip is protected by the carrier from physical damage and contaminants. However, regardless of the time when such separation is conducted—whether immediately after the construction of the finished strip in the manufacturing site, or soon before use—the carrier is capable of withstanding such a peeling step, required for detaching the carrier from the self-supported strip. In other words, the carrier is configured to have a tear strength larger than the peeling force required to perform such detachment.

The carrier and the carrier contact surface may be of any suitable material or combination of materials, as long as said materials are compatible with the manufacturing method. For instance, they need to be capable of withstanding the operating conditions of the method, such as by being resistant at least to the curing factors (e.g., to the temperature required for heat curing, or to the irradiation necessary for UV curing, etc.), the pressure, tension, or any other like parameter that can be applied during preparation of the multi-layer structure. More specifically, the carrier should be capable of maintaining mechanical integrity during and following exposure to the curing process, e.g., curing temperatures, such being typically up to 200° C. (or, in embodiments comprising UV curing—following exposure to UV radiation, etc). Mechanical integrity of the carrier is used herein interchangeably with "structural integrity" and includes, for example, dimensional stability, namely no shape distortions, stability of the finish characteristics of the carrier contact surface, explicitly including smoothness, lack of wrinkles, etc. Such mechanical integrity of the carrier should be maintained at least until the self-supported strip and the carrier are detached from one another.

In this context and without wishing to be held to any one theory, it is currently believed that in some embodiments, there may be charged or polar interactions between the carrier contact surface and the formed layer of fluid first curable material at the interface that provide the ink-transfer surface with properties that may be advantageous for various applications, e.g., when the ITM is used for printing. Presumably, in such embodiments, while the first curable material is still fluid, polar groups thereof interact with groups in the carrier contact surface, leading to alignment of polar groups in the direction of a surface of the curable layer. Subsequently, curing is effected to an extent sufficient to maintain this alignment at least to an appreciable degree. In some embodiments, such alignment of polar groups of the first curable material leads to changes in surface chemistry and surface energy that may influence the interaction of the ink transfer surface with a chemical conditioning agent, the ink and/or with the tacky layer.

Carrier Contact Surface of Metal

In some embodiments, the carrier contact surface comprises a surface selected from the group consisting of a metal (e.g., chromium, gold, nickel) surface and a metal oxide (e.g., aluminum oxide) surface. It is currently believed that in some such embodiments, polar groups of the fluid first curable material of the formed layer interact with metal (e.g., aluminum) atoms apparent on the carrier contact surface.

In some embodiments, the carrier includes, and in some embodiments consists of, a material selected from the group consisting of a metal foil, aluminum foil, a metallized polymer foil (e.g., metallized PET) and an aluminized polymer (e.g., aluminized PET) foil. In some embodiments, the polymer foil is coated with fumed aluminum metal.

Carrier Contact Surface of Polymer

In some embodiments, the carrier contact surface includes, and in some embodiments, consists of, a polymer surface.

In some embodiments, the carrier contact surface includes a polymeric surface which comprises polar groups such as Si—O—Si or C—O—C. While such groups clearly have a polar contribution, they would not be expected to chemically react with other species under typical process conditions. In some embodiments, the polar groups of the polymeric surface may include carbonyl groups (RCOR), carboxyl groups (—COOH, —COO$^-$), amide groups (—CONH$_2$), epoxy rings, acrylate groups (CH$_2$=CHCOO$^-$) and combinations thereof. It is currently believed that in some such embodiments, polar and/or functional groups of the formed outer layer (e.g., release layer) may interact with polar and/or functional groups apparent on the carrier contact surface.

In some embodiments, the carrier contact surface includes polar and/or functional groups having at least one free electron pair. In some such embodiments, at least one such polar and/or functional group is selected from the group consisting of carboxyl groups, carbonyl groups, amide groups and combinations thereof. In some such embodiments, the carrier contact surface comprises functional groups having at least one free electron pair selected from the group consisting of carbonyl groups and amide groups. It is currently believed that in some such embodiments, functional groups of the fluid first curable material of the formed layer interact with free electron pairs of the functional groups apparent on the carrier contact surface.

As mentioned above, the carrier should be selected to withstand inter alia the manufacturing process, which includes among other things withstanding the temperature of curing. In some embodiments, the carrier contact surface includes, mainly includes (at least 50% by weight), or consists essentially of, a polymer selected from the group consisting of polyesters, such as polyethylene terephthalate (PET), poly-fluorocarbons, such as polytetrafluoroethylene (PTFE, as exemplified by Teflon®), and polyimide (such as poly (4,4'-oxydiphenylene-pyromellitimide, as in Kapton® films, for example). PET-based carriers can typically withstand elevated temperatures of up to 120° C., 130° C., 140° C., or 150° C., while carriers made with poly-fluorocarbons and polyimide may be able to withstand even higher temperatures of up to 170° C., 180° C., 190° C., or 200° C. Alternatively, for low temperature of curing (e.g., up to 60° C., 70° C., 80° C., or 90° C.), the carrier contact surface may include, mainly include (at least 50% by weight), or consist essentially of, a polyolefin.

PET and Kapton® foils are particularly suited to be used as carriers. PET and Kapton® films are strong, have relatively high tear strength and tensile strength and very good dimensional stability at temperatures required for curing (e.g., up to 200° C.). Further, PET and Kapton® carriers are commercially available as large sheets of foil, e.g., at lengths of tens of meters (e.g., of 25 m or more, 50 m or more, 75 m or more, or 100 m or more) or even hundreds of meters (e.g., of up to 500 m, up to 1000 m or up to 2000 m) and a width above 1 meter (m), and even above 2 m, rendering the foil suitable as a carrier for an ITM for a large-format (e.g., about 1.5 m) printing machine. The foils are typically smooth, with average roughness below 100 nm. Foils are available at a variety of thicknesses ranging from less than 1 millimeter (mm) down to less than 25 μm, and a film thickness may be selected so as to provide a required tear strength, i.e. withstand the peel force involved in detaching the at least partially cured fluid first curable layer—while peeling the self-supported strip—from the carrier (or vice versa). PET and Kapton® foils are also suitable as carriers for having medium surface energy (typically in the range of about 35-45 mN/m when untreated), hence being hydrophobic, and substantially lacking functional groups on the surface (unless treated to that effect, in which case the surface energy can be in the range of about 60-70 mN/m), thus inhibiting adhesion thereon. Such foils may consequently allow the easy separation (i.e. separation involving relatively low force) of the at least partially cured fluid first curable layer therefrom. According to some embodiments, PET is preferable to Kapton®, as a carrier, for being considerably cheaper.

Inducing Hydrophilicity to the Cured Material by the Carrier

In some embodiments, carrier 50 may advantageously be configured or adapted to have a hydrophilic carrier contact surface, such hydrophilicity being employed to induce increased hydrophilicity on the surface coating in contact therewith, for instance on the release surface of the release layer. It is emphasized that "hydrophilicity" herein is used in the relative sense, meaning that a carrier contact surface having a relatively high surface energy $E_2$ may be employed to modify the surface energy of a release surface. More specifically, a curable material having a naturally-occurring surface energy $E_0$, where $E_0$ is smaller than $E_2$, may be used to form a release layer on the said carrier, so that the release surface of the release layer has a surface energy $E_1$ greater than $E_0$. In other words, the surface energy $E_1$ of the release layer may be altered, determined or tuned (relative to the naturally-occurring surface energy $E_0$) by forming the release layer on a carrier contact surface according to the teachings herein. According to some such embodiments, the carrier may be pre-treated or otherwise configured or adapted to have a specific surface energy (demonstrated by a specific hydrophilicity/hydrophobicity), so as to obtain a desired surface energy (and hence a desired hydrophilicity) of the release surface. It should further be noted that the "specific hydrophilicity/hydrophobicity" of a surface may be quantitatively assessed by contact angle measurements of a water drop on the surface, as is well known in the art and as utilized in the example provided herein below.

According to some embodiments, as illustrated by the detailed example hereinbelow, carrier 50 may be configured or adapted to have a hydrophilic carrier contact surface, thereby inducing a significant increase in the hydrophilicity of a release layer made form an initially hydrophobic curable material. According to some embodiments, a carrier film may be treated by the addition of antistatic agents, e.g., based on long-chain aliphatic amines (optionally ethoxylated) and amides, quaternary ammonium salts (e.g., behentrimonium chloride or cocamidopropyl betaine), esters of phosphoric acid, polyethylene glycol esters, or polyols, to name a few. It is believed that the molecules of such antistatic agents have both hydrophilic and hydrophobic areas. The hydrophobic side interacts with the surface of the carrier, and the hydrophilic side interacts with the air moisture and binds ambient water molecules, to render the film anti-static. This envisaged orientation of the anti-static molecules (or of any other molecules or parts thereof able to similarly align along a hydrophobic-hydrophilic axis or polar axis, whether in the carrier or in any other layer or material) can also be referred to as polarization. The ability of a material to polarize, as afore-described, may depend on the chemical structure of the material, the cross-linking density of the layer formed thereby, and the capacity of such molecules to align themselves within such a layer. Such alignment generally takes place during curing, the molecules having a higher mobility while the material is still fluid. However, it cannot be ruled out that such polarization may also occur in a cured layer.

In this example, a commercially available anti-static PET film is used as a carrier, the somewhat hydrophilic properties of the carrier contact surface are induced in the release layer surface (and more generally in any surface coating prepared by the present method).

In other words, carrier 50 may advantageously be formed of a commercially available anti-static polymeric film, for example, a polyester film such as PET.

The surprising advantages of such anti-static carriers will be illustrated in the following example wherein the polyester film was made of PET. A same first curable composition (curable release layer formulation No. 1, below detailed) was applied on three different carriers: a) an untreated polyester film (i.e. not anti-static), such as commercially available Skyroll SH 76 by SKC Inc.; b) an anti-static polyester film, such as commercially available Skyroll SH 92 by SKC Inc.; and c) an aluminized polyester film, available from Hanita Ltd.

An exemplary curable release layer formulation No. 1 was prepared by thoroughly mixing the materials provided in Table 1 below.

TABLE 1

| Ingredient | Supplier | CAS Number | Description | Weight parts |
|---|---|---|---|---|
| DMS-V36 Resin | Gelest | 68083-19-2 | Vinyl terminated polydimethyl siloxane Viscosity 5,000 mPa · s MW ~49,500 Vinyl ~0.018-0.050 mmol/g | 70.0 |
| VQM-146 Resin | Gelest | 68584-83-8 | 20-25% Vinyl resin in DMS V46 Viscosity 50,000-60,000 mPa · s Vinyl ~0.18-0.23 mmol/g | 40.0 |
| Polymer RV 5000 (XPRV 5000) Resin | Evonik | | Vinyl functional polydimethyl siloxane Viscosity 3,000 mPa · s Vinyl ~0.4 mmol/g | 30.0 |
| Inhibitor 600 Cure Retardant | Evonik | 204-070-5 | Mix of divinylpolydimethylsiloxane and 2-methylbut-3-yn-2-ol Viscosity 900 mPa · s Vinyl 0.11 mmol/g | 5.0 |
| SIP6831.2 Catalyst | Gelest | 68478-92-2 | Platinum divinyltetramethyldisiloxane Platinum 2.1-2.4% | 0.1 |
| HMS-301 Cross-Linker | Gelest | 68037-59-2 | Poly(dimethylsiloxane-co-methyl-hydrosiloxane), trimethylsilyl terminated Hydride 4.2 mmol/g | 12.0 |
| Silsurf A010-D-UP Additive | Siltech | 134180-76-0 | Polyether siloxane copolymer | 5.0 |

The curable fluid was applied on the three tested carriers as described in more detail for formulation No. 2 and cured in a similar manner. The carriers were peeled away, exposing the surface previously in contact therewith, such surfaces intended to serve as ink image receiving surface in a printing system. The advancing (ACA) and/or receding (RCA) contact angles of a 0.5-5 microliter (µl) droplet of distilled water were measured on the different carriers and on the ink receiving surface of the cured release layers casted thereon. For comparison, contact angle was also assessed on the surface of the release layer which faced air during casting and curing (i.e., the back side of the surface coating which can be further attached to a base).

A relatively low contact angle (pointing to a more hydrophilic surface) is deemed correlated with a higher proportion of molecules being oriented along the hydrophobic-hydrophilic direction within the underlying layer. In other words, a relatively lower contact angle on surface suggests a greater polarization of underlying molecules, or parts thereof, as compared to a surface having a relatively higher contact angle (pointing to a more hydrophobic surface).

All contact angle measurements were performed with a Contact Angle analyzer—Krüss™ "Easy Drop" FM40Mk2 and/or a Dataphysics OCA15 Pro (Particle and Surface Sciences Pty. Ltd., Gosford, NSW, Australia). The results are shown in Table 2.

TABLE 2

| Carrier | Contact Angle of Carrier | | RCA of Cured Release Layer |
|---|---|---|---|
| | ACA | RCA | |
| Untreated PET | 70° | 40° | 62° |
| Anti-Static PET | 40° | 20° | 45° |
| Aluminized PET | 80° | 40° | 62° |

Surprisingly, while the hydrophobicity of the back side of the surface coating (which served to approximate the hydrophobicity of a layer conventionally prepared with an air interface) was of about 90°, the ink transfer surfaces of the release layers prepared according to the present inventions herein tested displayed significantly lower values of at most about 60°. While the untreated and aluminized PET provided for a relatively similar and dramatic effect, the anti-static PET further lowered the RCA value from about 60° for the former carriers to about 45°. Such results are surprising, as the release layers were expected (based on their chemical composition) to be hydrophobic. This was confirmed by the RCA displayed by the back side of the layer. The inventors have surprisingly found, however, that the release layer surfaces produced by the inventive method may actually be somewhat hydrophilic, and appreciably more hydrophilic than corresponding release layers, i.e., release layers having the same composition, but manufactured using the conventional curing technique in which the release layer is exposed to air ("standard air curing"). Without wishing to be bound by theory, the inventors believe that during the intimate contact between the carrier contact surface and the incipient release layer surface, the somewhat hydrophilic properties of the carrier contact surface are induced in the release layer surface (and more generally in any surface coating prepared by the present method).

As can be seen from Table 2, the RCA of the surface formed while facing the carrier is about 20° greater than the RCA of the respective carrier and approximately 30° smaller than the RCA believed to represent the composition per se. While it cannot be ruled out that the "margins" surrounding the RCA of the surface coating as compared to its more hydrophilic carrier and its more hydrophobic composition may vary, without wishing to be bound by any particular theory, it seems that a surface coating prepared according to the present method has a contact surface whose hydrophilicity/hydrophobicity properties lie in between the properties of the same formulation, cured in air, and the carrier surface itself. Thus, the selection of a carrier having known hydrophobicity (or as illustrated in this example, hydrophilicity) may govern, at least to some extent, the hydrophobicity of the surface that is cast thereon. As the carriers as used herein can be further treated by physical or chemical treatment, in some such embodiments, the treatment can modify the hydrophobicity/hydrophilicity of the carrier, and in turn may affect the hydrophobicity/hydrophilicity of the surface coating, as assessed by way of example by the measurement of its RCA.

Forming Fluid First Curable Layer Surface

As noted above, a layer of a fluid first curable material is formed with one side of the layer contacting the carrier contact surface, the layer constituting the incipient release layer of the ITM.

To ensure adequate contact between the carrier contact surface and the layer, as well as to ease processing, in some embodiments the carrier contact surface is wettable by the fluid first curable material. Having a wettable carrier contact surface advantageously improves the uniformity of the layer to be formed thereupon. Such increased wettability may also provide for or be associated with reduced surface defects, such as pin holes, "orange peel" and the like. Accordingly, in some embodiments, the surface energy of the carrier contact surface can be between 20 and 70 mJ/m$^2$, between 25 and 65 mJ/m$^2$, or between 30 and 60 mJ/m$^2$, such values being determined with distilled water at ambient temperature (circa 23° C.).

To simplify the process of forming the layer of the fluid first curable material, in some embodiments the fluid first curable material is at a temperature of at least 10° C. and not more than 50° C. during the forming of the layer. In some embodiments, the temperature is at least 15° C. In some embodiments, the temperature is not more than 40° C. and even not more than 35° C.

In some embodiments, the forming of the incipient release layer of the fluid first curable material comprises depositing the layer of the fluid first curable material onto the carrier contact surface, thereby forming the incipient release layer. In some embodiments, depositing the layer of the fluid first curable material onto the carrier contact surface comprises pouring the fluid first curable material onto the carrier contact surface.

The layer is of any suitable thickness. In some embodiments, the thickness of the incipient release layer is such that when substantially fully cured, the resulting release layer is not less than 2 micrometers and not more than 200 µm thick. By "fully cured" or "substantially fully cured", which can be used interchangeably, is meant a stage of curing is reached or passed where the layer does not undergo any further substantial change in dimensions.

In some embodiments, it is desirable that the release layer of the ITM be of a relatively uniform thickness to provide superior printing results. Accordingly, in some embodiments, the variance of thickness of the layer of applied fluid first curable material is such that when substantially fully cured, the variance of thickness of the resulting release layer is within 5 micrometers, or within 2 micrometers, or within 1 µm, or within 0.5 µm, or within 0.2 µm of a predetermined thickness. In some embodiments, the variance of thickness of the layer of the applied fluid first curable material is such that when substantially fully cured, the variance of thickness of the resulting release layer is within 20% of a predetermined thickness, or within 15%, or within 10%, or within 5%. In some embodiments, during the forming of the layer of the fluid first curable material, the thickness of the formed layer of the fluid first curable material is mechanically adjusted while the first curable material is still fluid, for example, with the help of a knife, bar or roller. The skilled person knows how to select such a leveling means according to the desired thickness of the layer and/or the necessary accuracy.

Curing

The fluid first curable material is cured in any suitable way, including fast curing and slow curing methods. The curing method selected may depend on the specific formulation of first curable material used.

In some embodiments, the method further comprises applying heat to the layer of the fluid first curable material, thereby increasing the rate of curing thereof.

In some embodiments, the method further comprises irradiating the layer of the fluid first curable material, thereby increasing a rate of curing thereof. Irradiation is with any suitable radiation, for example, UV light and electron beam.

Fluid First Curable Material

As explained above, a suitable fluid first curable material is preferably configured for molding at about room temperature, i.e. is fluid between about 10° C. and 50° C. and in some embodiments between about 15° C. and up to about 40° C. or even up to about 35° C. Further, when used with a selected carrier, a suitable fluid first curable material preferably wets the carrier contact surface so as to obtain a continuous, uninterrupted and unbroken contact between the carrier contact surface and the release surface of the incipient release layer. Such a continuous, uninterrupted and unbroken contact may readily assist in generating a release surface which is substantially defect-free, or—alternatively or additionally—having a smoothness not less than the smoothness of the carrier contact surface.

Silicones, such as siloxane, and polyurethane are two examples of materials that are fluid at about room temperature while uncured and that are heat-curable at temperatures suitable for the method described herein. Cured siloxane and polyurethane are further relatively resilient to working conditions—particularly temperature, pressure and exposure to chemicals—that are characteristic to those of an ITM in a printing machine. In "resilient" it is meant that an ITM having such a release layer could function well under a suitable work load in terms of intensity and time without damaging the release layer.

Various (cured) silicone elastomers (such as siloxanes) or polyurethanes are available at a wide range of hardness, including low hardness lower than about 40 Shore A, or 30 Shore A, or even as low as 20 Shore A, or medium hardness, e.g., between about 40 and 60 Shore A, or even at a high hardness, e.g., between about 60 and 90 Shore A, thus rendering such silicones/siloxanes or polyurethanes particularly suitable as a release layer in an ITM. All foregoing ranges of hardness are compatible with an elastomeric behavior of the material once cured.

It should be understood that a suitable fluid first curable material may comprise any of the example materials discussed herein for the fluid first curable material, and other suitable example materials which are liquid at room temperature. In some embodiments, a suitable fluid first curable material may be 100% comprised of any such an example material, whereas in other embodiments a suitable fluid first curable material may comprise a two-part system (e.g., the resin and its hardening system being separated) suitable for the preparation of such an example material, each part being fluid at room temperature. In still other embodiments, a suitable fluid first curable material may be a solution which comprises such an example material, or a two-part system thereof, and also comprises a non-reactive solvent. For instance, the solvent may be an organic solvent (e.g., xylene) miscible with the example material or materials, yielding a one phase solution.

When employed onto some types of polymer carriers, such as polyester PET or polyimide Kapton® films, for forming a layer thereon, silicone elastomers, such as siloxanes, and polyurethanes typically wet the carrier contact surface (in the steady state), for having surface energy in the range of 20-35 mN/m, namely comparable or lower than that of the said carriers. According to some embodiments such wetting, which is generally desired in the scope of the method described herein, may be enhanced using known surface treatments applied to the carrier contact surface, such as activation by plasma, or UV radiation, or by corona treatment, or by chemical treatment (e.g., by application of treating fluids, including for instance surfactants). However, such surface treatment that can increase the carrier contact surface energy, may also enhance adhesion of the cured (or partially cured) surface coating or release layer to the carrier to an extent that may, for instance, hamper subsequent peeling.

It is noted that adhesion of the release layer to the carrier contact surface subsequent to curing may preferably be within a desired range. If adhesion is insufficient (namely too low), the release layer (due to serve during printing as ink-transfer surface) may separate from the carrier contact surface during curing, leading to deformation of the ink-transfer surface, or at some other undesirable time. If adhesion is too strong, during separation of the ITM from the carrier contact surface, the carrier contact surface may tear, so as to leave a residue on the ink-transfer surface, or conversely part of the release layer may be ripped so as leave a residue on the peeled carrier, or the ink-transfer surface may be otherwise damaged.

Thus, according to some embodiments, an uncured fluid material such as a silicone liquid, including or consisting of, by way of non-limiting example, siloxane, and polyurethane may preferably be employed onto a polymer carrier such as made of PET or Kapton®, without a prior surface treatment of the carrier to be subsequently cured thereupon. In such embodiments, the inert nature of both the carrier and the curable fluid material—namely the lack of strong chemical reactions on the interfacing surfaces thereof—prevent strong adhesion, the residual adhesion that maintain the fully cured or partially cured layer attached to the carrier, resulting from the preliminary wetting of the carrier by the uncured material. Upon curing (e.g., cross-linking), the material forms an elastomer.

According to some embodiments, a fluid first curable material (such as the curable materials discussed above, e.g., siloxane) may be applied to a carrier having a low surface energy, lower for example than 25 mN/m or even lower than about 20 mN/m (e.g., Teflon® carrier contact surface). In such cases, if the liquid has a higher surface energy than the carrier contact surface, wetting may still be achieved because viscosity of the fluid first curable material is high enough to quench beading of the fluid, which is expected in the steady state. In other words, by employing a viscous fluid first curable material onto a low-surface energy carrier contact surface, beading of the fluid may be depressed, and consequently a continuous, uninterrupted and unbroken contact may be achieved between the fluid first curable material and the carrier. Then, curing or at least partial curing may preferably be employed within a short enough time after the application or deployment of the fluid first curable material onto the carrier, so as to cure the release layer before significant beading occurs. Additionally, due to the low surface energy of the carrier contact surface, adhesion of the cured release layer to the carrier contact surface subsequent to curing may be constricted to a desired range, facilitating later detachment of the release layer from the carrier by peeling.

Some siloxanes may be employed to form a layer on metalized surfaces as described above. For example, addition-curable siloxanes do not typically adhere to metalized surfaces (e.g., an aluminum surface) and therefore may be employed for forming a release layer peelable from the carrier as described herein on an aluminum surface such as an aluminum plate, or aluminum foil, or aluminized film. In contrast, condensation-curable siloxanes might typically adhere to an oxidized layer naturally formed on metalized surfaces such as aluminum surface, and hence might be less suitable in such cases. It is noted however that in some commercially available aluminized polymer foils, the aluminum surface is further coated (e.g., by nitrocellulose) thus rendering the aluminized foil suitable as a carrier also for condensation-curable siloxanes.

A first curable material may be selected that, when cured, has properties suitable for use as an ink transfer surface of an ITM. Such properties include chemical compatibility with ink formulations, the property to retain an ink droplet applied to the ink transfer surface at the image-forming station, and the property to release the tacky film to a substrate, typically in its entirety, without tearing or deformation thereof.

In some technologies, indirect printing can be done on an ITM previously conditioned to facilitate such ink attachment and release, in which case the outer surface of the ITM needs to be alternatively compatible with the conditioning treatment. In the event of a chemical treatment, the above principles can apply to the conditioning formulation in a manner substantially similar to those previously described for an ink formulation. Though in the present disclosure, for the sake of simplicity, the interaction being considered is between an ink-transfer surface and an ink formulation, such terminology should not be construed as limiting.

In some embodiments, the fluid first curable material comprises a silicone polymer, for example, a polydimethylsiloxane.

In some embodiments, the fluid first curable material comprises a vinyl-terminated silicone polymer, for example, a vinyl-terminated polydimethylsiloxane.

In some embodiments, the fluid first curable material comprises a vinyl-functional silicone polymer, e.g., a vinyl-silicone polymer including at least one lateral vinyl group in addition to the terminal vinyl groups, for example, a vinyl-functional polydimethylsiloxane.

In some embodiments, the fluid first curable material comprises a heat-curable addition cure silicone polymer. Heat-curable materials have an advantage of including materials that are suitable for use as a release layer.

In some embodiments, the fluid first curable material comprises a condensation cure silicone polymer.

Forming the Base of the ITM

As discussed above, an ITM includes at least two, and typically more than two, layers, e.g., the ink transfer layer and a base of the ITM that includes a support layer. A feature of some embodiments of the disclosure herein is that an ITM is made from the outside-in, first preparing an incipient release layer as discussed hereinabove, and then forming succeeding layers serially, one after the other, on the exposed side of a previously-made layer.

Forming the Base of the ITM with a Fluid Curable Material

In some embodiments, the portion of the base that is proximate to the release layer is made by forming a layer of a fluid second curable material on the other side of the first curable material. Accordingly, in some embodiments the method further comprises forming a layer of a fluid second curable material on the other side of the layer of the first curable material, the layer of the fluid second curable material constituting an incipient layer of the base of the ITM. By "other side of the layer of the first curable material" is meant the side that is not in contact with the carrier contact surface.

In some embodiments, the method further comprises at least partially curing the layer of the second curable material, thereby forming at least part of the base of the ITM.

The thickness of the layer of the fluid second curable material is typically determined by the required thickness of the layer of the base that the layer of the fluid second curable material, when cured, constitutes. In some embodiments, the thickness of the layer of the fluid second curable material is such that when substantially fully cured, the resulting support layer is not less than 100 micrometers and not more than 500 micrometers thick.

In some embodiments, the layer of the fluid second curable material is formed while the layer of the first curable material is not fully cross-linked. The incipient layer of the first material is sufficiently cross-linked so as to provide backing/support to the new layer of the second material (e.g., having sufficient mechanical integrity to withstand, for instance, doctor blade application), such cross-linking being sufficiently partial so as to retain functional groups on the polymer backbone able to cross-link with the functional groups of the polymer of the second curable material. Such possible cross-linking between curable materials of different layers is expected to improve their mutual adhesion. Additionally or alternatively, the fluid second curable material can further include an adhesion promotor, such material generally diffusing towards the interface with the incipient layer of first curable material to facilitate their bonding. For instance, if the fluid second curable material includes a silicone polymer, then silanes could be added to promote adhesion to a fluid first curable material also made of silicone.

In some alternative embodiments, the forming the layer of the fluid second curable material comprises:

after the layer of the first curable material cures to an extent so as to be no longer fluid, optionally applying a primer layer to the layer of the first curable material; and depositing the fluid second curable material on the primer layer or on the layer of the first curable material, thereby forming the layer of the fluid second curable material.

The primer is a material as known in the art that adequately bonds to both the first curable material and the second curable material, such attachment being retained while the respective layers are cured. Typically, a primer comprises at least some functional groups that bond to the first curable material and other different functional groups that bond to the second curable material. The thickness of the primer layer is any suitable thickness, in some embodiments, between 0.1 and 50 micrometers, or between 100 nanometers and 5 micrometers.

The layer of fluid second curable material may be deposited on the primer layer or on the layer of the first curable material in any suitable manner. In some embodiments, the depositing of the fluid second curable material is by pouring the fluid second curable material onto the primer layer or first curable material layer. In some embodiments, the second curable material is levelled onto the primer layer or first curable material layer using a wire rod or any appropriate levelling device or like applicator.

It is well known in the art that the addition of a solid reinforcement material to a fluid curable material leads to the formation of composite materials (e.g., fiber-reinforced plastic) having advantageous properties, typically including increased tenaciousness and/or tensile strength and/or reduced deformability.

In some embodiments, especially in embodiments where the fluid second curable material constitutes an incipient support layer of the base, while not being essential, the fluid second curable material may comprise a solid reinforcement material. In some such embodiments, the fluid second curable material comprises the solid reinforcement material prior to the forming of the layer of the fluid second curable material. For example, in some such embodiments, the fluid second curable material comprises reinforcement material suspended therein. For example, in some such embodiments, the fluid second curable material impregnates a solid reinforcement material, e.g., a fabric.

In some embodiments, the method comprises, subsequently to the forming of the layer of the fluid second curable material and while the second curable material is still fluid, embedding a solid reinforcement material in the layer of the fluid second curable material. For example, in some such embodiments, a solid reinforcement material, e.g., a fabric, is pressed into (and thereby embedded in) a layer of still-fluid second curable material.

In some embodiments, the method comprises, subsequently to the forming of the layer of the fluid second curable material, and while the second curable material is still fluid, placing a solid reinforcement material on an exposed surface of the layer of the fluid second curable material. For example, in some such embodiments, a solid reinforcement material, e.g., a fabric, is laid on a layer of still-fluid second curable material.

In such embodiments, the base will include a reinforcement material (e.g., fibers optionally forming a fabric, hence also termed a fiber reinforcement), due to the fluid second curable material comprising reinforcement material suspended therein, due to a solid reinforcement material being pressed into a layer of the still-fluid second curable material, or due to a solid reinforcement material being laid on a layer of sill-fluid second curable material.

Forming the Base of the ITM with a Pre-Formed Sheet

In some embodiments, the portion of the base that is proximate to the release layer is made by securing a pre-formed solid layer or solid sheet to the other side of the first curable material.

Accordingly, in some embodiments, the method further comprises:
- providing a sheet constituting an incipient layer forming at least part of the base of the ITM;
- contacting the sheet to the other side of the layer of the first curable material; and
- securing the sheet to the other side of the layer of the first curable material.

In some embodiments, the sheet is a polymer sheet. In some embodiments, the sheet is solely made of a single layer of material. In some embodiments, the sheet is a multi-layer sheet, having at least two different layers.

In some embodiments, the contacting of the sheet is carried out while the layer of the first curable material is still fluid. During the curing of the first curable material, bonds are formed between the curing first curable material and the sheet, thereby securing the sheet to the first curable material.

Alternatively, in some embodiments, the method further comprises:
- after the layer of the first curable material cures to an extent so as to be no longer fluid, applying an adhesive layer to the layer of the first curable material; and
- contacting the sheet with the adhesive layer, thereby securing the sheet to the other side of the layer of the first curable material.
- Additionally or alternatively, an adhesive layer can be applied to the sheet. In such a case, the sheet, or adhesive layer, may contact the layer of the first curable material, or an adhesive layer applied thereto.

As known in the art, an adhesive is a material that adequately bonds to both the first curable material and the sheet. Typically, an adhesive comprises at least some functional groups that bond to the first curable material and other different functional groups that bond to the sheet. The thickness of the adhesive layer is any suitable thickness, in some embodiments between 0.1 and 50 micrometers or between 100 nanometers and 5 μm.

In some embodiments, the sheet comprises embedded solid reinforcement material (e.g., a fiber reinforcement such as a fabric).

Solid Reinforcement Material

Any solid reinforcement material may be found in the layer of the base that is proximate to the release layer.

Any suitable amount of solid reinforcement material may be found in the layer of the base that is proximate to the release layer. In some embodiments, the amount is not more than 10% by weight.

In some embodiments, the solid reinforcement material comprises, and in some embodiments, consists or consists essentially of, particles.

In some embodiments, the solid reinforcement material comprises, and in some embodiments, consists or consists essentially of, fibers.

In some embodiments, the fibers have a thickness of not less than 50 micrometers and not more than 200 micrometers.

In some embodiments, the fibers comprise a material selected from the group consisting of organic fibers, meta-aramid, para-aramid, polyamide, nylon fibers, polyester fibers, high density polyethylene fibers, natural fibers, cotton fibers, inorganic fibers, glass fibers, carbon-fiber fibers, ceramic fibers, metal fibers and combinations thereof.

In some embodiments, the fibers are surface-treated fibers, which surface treatment increases adhesion of the fibers, in some embodiments, to vinyl silanes.

In some embodiments, the fibers constitute a fabric. In some embodiments, the fabric has a thickness of not less than 50 micrometers and not more than 200 micrometers. In some embodiments, the fabric is 1-ply, in some at least 2-ply, in some at least 3-ply, and in some embodiments at least 4-ply.

In some embodiments, fabrics made of thin fibers (e.g., of up to 1 mm thickness, or of up to 0.8 mm thickness, or of up to 0.6 mm thickness, or of up to 0.4 mm thickness, or even of up to 0.2 mm thickness) and having a relative high yarn density are desirable for particularly smooth finished surface. The yarn density can be expressed by the number of threads in the warp and weft direction of the fabric per unit of length. The number of threads in any given direction can be as low as about 10 per cm and as high as about 20 or even 30 per cm. The number of threads in each direction may be equal (e.g., 10*10) or may not be equal (e.g., 9*8, 12*10, 16*15, 17*12, 19*13, 19*12, or 19*10).

In some embodiments, the fabric is a non-woven fabric. In some embodiments, the fabric is a woven fabric.

In some embodiments, the fibers are oriented fibers. In some embodiments, the fibers are uni-directionally oriented, typically in parallel to the ITM longitudinal axis to reduce stretching. In some embodiments, the fibers are bi-directionally oriented, typically some oriented in parallel (0°) and some perpendicularly (90°) to the ITM longitudinal axis. In some embodiments, the fibers are three-directionally oriented, typically some oriented in parallel (0°), some perpendicularly (90°) and some either at 45° or −45° to the ITM longitudinal axis. In some embodiments, the fibers are four-directionally oriented, typically some oriented in parallel (0°), some perpendicularly (90°), some at 45° and some at −45° to the ITM longitudinal axis.

In some embodiments, the fibers may be attached one to another to form an unwoven or woven fabric ply. Fibers may be woven by any suitable weaving method of interlacing warp (0°) and weft (90°) fibers. Standard patterns include plain weave (wherein each warp fiber passes alternately under and over each weft fiber); basket weave (wherein two or more warp fibers alternately interlace with two or more weft fibers); and twill weave (wherein one or more warp fibers alternately weave over and under two or more weft fibers in a regular repeated manner), including satin weave, for which the number of fibers crossed and passed under is typically above four. Plain weave advantageously permits high yarn density and smooth finished surfaces.

Depending on any of the above-mentioned parameters, a fabric may be further characterized by its weight per surface, typically expressed in gram per square meter. Fabrics having a weight per unit area between about 180 g/m² and about 1000 g/m² can be suitable.

Finishing the ITM

Finishing the ITM relates to the steps, in addition to those recited above, that are required to complete the manufacture of the ITM so that the ITM is ready for use.

In some embodiments, throughout the manufacturing process, the release layer is not separated from the carrier, so that the carrier serves as a protective layer for the ink-transfer surface. Accordingly, in some embodiments, the method further comprises, subsequently to '3', finishing manufacture of the ITM without separating the release layer from the carrier. Such embodiments are preferably implemented when the carrier is a flexible foil that can bend together with the incipient ITM during various stages of the manufacturing process, including formation of a looped form typical for ITMs, and also allowing the method to be implemented as a continuous production process where large laminated rolls (comprising the carrier, the incipient release layer and, optionally, one or more layers of the base) are made, that are subsequently cut to desired lengths for making an actual specific ITM.

In some embodiments, the finishing manufacture includes forming at least one additional layer that constitutes a portion of the base. The above-described process is repeated a required number of times to yield the required number of layers for the ITM base, whether by securing a pre-formed sheet that constitutes a layer of the ITM or by forming a layer of a fluid curable material that, when cured, constitutes a layer of the ITM. Any suitable layer or layers are added and include a support layer (that typically includes fibers to provide stretch resistance) and a soft compliance layer.

In some embodiments, the finishing manufacture includes adding lateral projections to lateral edges of the incipient ITM. In some embodiments, such lateral projections allow a printing machine to accurately engage the ITM with no slippage.

In some embodiments, the finishing manufacture includes "post-curing", a process by which the almost-completed ITM is stored at elevated temperature to ensure that the various layers have cured sufficiently to ensure desired physical properties and/or sufficient inter-layer adhesion. The post-curing may occur, prior to, or subsequent to the peeling.

In some embodiments, the method further comprises, subsequently to '3', packaging the ITM without separating the release layer from the carrier, so that the carrier serves as a protective layer for the ink-transfer surface during transport.

A person having ordinary skill in the art is familiar with such additional finishing steps and how such steps or similar ones can be carried out, so that further details are not necessary.

Use of the ITM

In some embodiments, throughout the manufacturing process and until just before or after the ITM is mounted on, or into, an indirect printer, the release layer is not separated from the carrier, so that the carrier serves as a protective layer for the ink-transfer surface, for example, during storage, transport and installation.

Thus, according to an aspect of some embodiments of the disclosure herein, there is provided a method of mounting an intermediate transfer member (ITM) on an indirect printer, the method comprising:
  providing an ITM prepared as described herein, while the release layer is still in contact with the carrier;
  mounting the provided ITM on, or into, an indirect printer; and
  subsequently to the mounting, separating the carrier from the release layer.

Thus, according to an aspect of some embodiments of the disclosure herein, there is also provided a method of mounting an intermediate transfer member (ITM) on, or into, an indirect printer, the method comprising:
  providing an ITM prepared as described herein while the release layer is still in contact with the carrier;
  separating the carrier from the release layer; and
  mounting the provided ITM on, or into an indirect printer, said mounting being optionally performed within 1 hour from separating the carrier from the release layer.

Intermediate Transfer Member (ITM)

According to an aspect of some embodiments of the disclosure herein, there is also provided an ITM manufactured as described herein.

Production of an article in accordance with the invention commences with the provision of carrier designated 50 in FIG. 3A. In all the drawings, to distinguish it from the layers that form part of the finished article, the carrier 50 is shown as a solid black line.

Carrier 50 has an upper surface, constituting a carrier contact surface 52 of which the finish matches the desired finish of the surface coating of the finished article.

In some embodiments, for an ITM, carrier contact surface 52 may be a smooth or well-polished flat surface (e.g., having a roughness of Ra less than about 125 nm, for instance between 50 nm and 100 nm), that is typically defect-free within an area of at least 1,000 cm$^2$, at least 5,000 cm$^2$, or at least 20,000 cm$^2$. In some embodiments, it may be desirable for the articles to have a matt or even-patterned surface. Flexible foils are typically provided with information concerning their surface roughness, but, if needed, such data can be assessed by routine experimentation using standard measuring methods known to the skilled person, such as LEED, STM, AFM, and other methods discussed above.

In some embodiments, the carrier contact surface may be flat not only in the micro scale, namely in terms of smoothness of the surface as herein-described, but also in the macro scale and broader sense of lack of waviness. Waviness, which can be expressed, for instance, in terms of waviness height, e.g., by Wa & Wt, and waviness spacing, Wsm, can be measured along any suitable waviness evaluation length adapted to the carrier surface being considered. Waviness can be measured according to standard procedures using a variety of instruments, such as a surface finish profilometer, which includes stylus-based contact instruments as well as optical and laser-based non-contact instruments. In some embodiments, the carrier contact surface has a waviness Wa of 100 μm or less, 50 μm or less, 10 μm or less, 5 μm or less, 1 μm or less, 0.8 μm or less, or 0.6 μm or less; and optionally of more than 20 nm, more than 50 nm, more than 75 nm, more than 100 nm or more than 200 nm. In some such embodiments, this waviness profile is determined over an evaluation or sampling length of about 10 mm, of about 50 mm or of about 100 mm. As the waviness of the carrier contact surface may dictate the waviness of the layer cured at least partially while in contact therewith, in some embodiments, the surface of the cured layer (as measured following peeling) may have a waviness Wa of 100 μm or less, 50 μm or less, 10 μm or less, 5 μm or less, 1 μm or less, 0.8 μm or less, or 0.6 μm or less. In some embodiments, the waviness Wa of the surface of the cured layer may be more than 20 nm, more than 50 nm, more than 75 nm, more than 100 nm, or more than 200 nm.

The method of the disclosure allows any desired surface finish to be achieved, as determined primarily by the carrier contact surface, regardless of the texture of the base on which the surface coating is supported in the finished article, such that many potential sources of defects are minimized or avoided.

It is to be noted that in the examples provided herein to illustrate the outstanding advantages of the inventive method, the smoothness of the cured surfaces was found to be highly similar (within ±10%) to the smoothness of the carrier contact surface. The exemplary layers of curable materials effectively replicated the surface texture and/or topography of the carrier upon which they were formed.

Additionally and alternatively, the finish of the carrier contact surface can be hydrophilic or hydrophobic. Typically, the carrier surface is hydrophilic, having a receding contact angle below 90°, below 80°, or below 70°, and more typically, below 60°, below 55°, or below 50°. However, even in embodiments wherein the carrier contact surface is hydrophobic, and the liquid first curable material has even a lower surface energy, wetting is achieved, as explained above. Moreover, in embodiments employing viscous fluid first curable material (the viscosity depressing beading of the fluid first curable material on the carrier contact surface as described above), the carrier contact surface may advantageously have low surface energy, thereby facilitating peeling of the release layer from the carrier.

In some embodiments, the carrier and/or its contact surface can be treated prior to the application of the first curable composition. Such treatment can be chemical (e.g., application of chemical agent) and/or physical (e.g., corona treatment, plasma treatment, ozonation, etc.). Carrier 50 may be inflexible, being formed for example of a sheet of glass or metal but it is preferred for it to be formed of a flexible foil. In one embodiment, the foil is a sheet of aluminum-PET or PET having a thickness of between 0.05 mm and 1.00 mm so as to remain flexible but difficult to bend through a small radius, that is to say, it will not wrinkle.

The remaining steps described below apply to the manufacture of an ITM suitable for the Nanographic Printing™ technology of Landa Corporation, but it should be clear that the invention can be used for an ITM suitable for different printing technologies and for articles other than an ITM, such as articles having a hydrophobic release coating that may be of moderate hydrophobicity or of moderate hydrophilicity.

In a step, the results of which are shown in FIG. 3B, a fluid first curable composition (illustrated as 136a in FIG. 5A) is provided and a layer 56 is formed therefrom on carrier contact surface 52, layer 56 constituting an incipient release layer having an outer ink-transfer surface 54.

The fluid first curable composition of the release layer 56 may comprise an elastomer, typically made of a silicone polymer, for example, a polydimethylsiloxane, such as a vinyl-terminated polydimethylsiloxane.

In some embodiments, the fluid first curable material comprises a vinyl-functional silicone polymer, e.g., a vinyl-silicone polymer including at least one lateral vinyl group in addition to the terminal vinyl groups, for example, a vinyl-functional polydimethyl siloxane.

In some exemplary embodiments, the fluid first curable material comprises a vinyl-terminated polydimethylsiloxane, a vinyl-functional polydimethylsiloxane including at least one lateral vinyl group on the polysiloxane chain in addition to the terminal vinyl groups, a crosslinker, and an addition-cure catalyst, and optionally further comprises a cure retardant.

In some embodiments, a polydimethylsiloxane (PDMS) may be preferred for the fluid first curable composition of the release layer 56, if the ITM may be subjected to elevated temperatures (e.g., of above 150° C.) for a prolonged period of time (e.g., at least one hour). If the ITM will not be subjected to elevated temperatures for such periods, then other fluid curable materials able to form elastomers may also be appropriate (e.g., polyurethanes).

An exemplary curable release layer formulation No. 2 was prepared by thoroughly mixing the materials provided in Table 3 below.

TABLE 3

| Ingredient | Supplier | CAS Number | Description | Weight parts |
|---|---|---|---|---|
| DMS-V46 Resin | Gelest | 68951-99-5 | Vinyl terminated polydimethyl siloxane Viscosity 60,000 mPa · s MW ~117,000 Vinyl ~0.018-0.020 mmol/g | 100.0 |
| VQM-146 Resin | Gelest | 68584-83-8 | 20-25% Vinyl resin in DMS V46 Viscosity 50,000-60,000 mPa · s Vinyl ~0.18-0.23 mmol/g | 40.0 |
| Inhibitor 600 Cure Retardant | Evonik | 204-070-5 | Mix of divinylpolydimethylsiloxane and 2-methylbut-3-yn-2-ol Viscosity 900 mPa · s Vinyl 0.11 mmol/g | 5.0 |
| SIP6831.2 Catalyst | Gelest | 68478-92-2 | Platinum divinyltetramethyldisiloxane Platinum 2.1-2.4% | 0.1 |
| HMS-301 Cross-Linker | Gelest | 68037-59-2 | Poly(dimethylsiloxane-co-methylhydrosiloxane), trimethylsilyl terminated Hydride 4.2 mmol/g | 4.0 |

Figure 4:
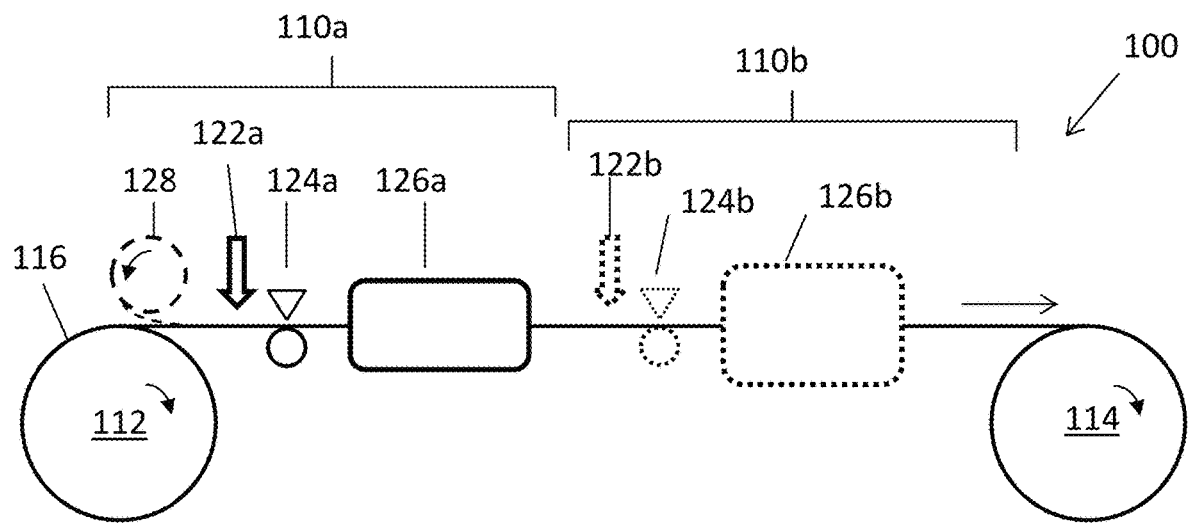
FIG. 4 schematically displays an apparatus in which some embodiments of the present method can be implemented, and FIG. 5A to 5C schematically display different manufacturing stages using the apparatus of FIG. 4.
Figure 5A:
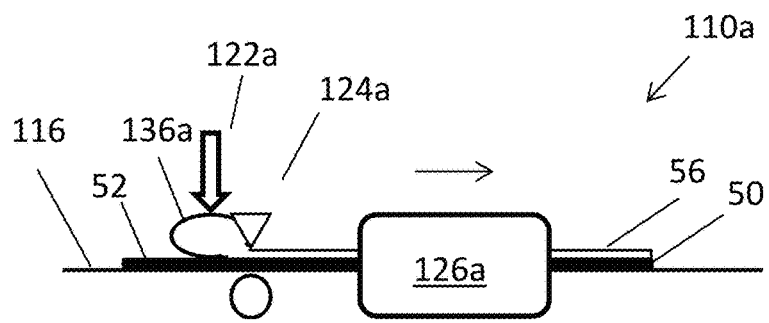

The layer 56 of fluid first curable composition is applied to carrier contact surface 52, and is subsequently cured. Layer 56 may be spread to the desired thickness using, for example, a doctor blade (knife on a roll), without allowing the doctor blade to contact the surface that will ultimately act as the ink-transfer surface 54 of the ITM so that imperfections in the doctor blade will not affect the quality of the finished product. Generally, layer 56 may have a thickness of between about 2 micrometers and about 200 micrometers. An apparatus in which such step and method can be implemented is schematically illustrated in FIGS. 4 and 5A.

For example, the above-detailed release layer formulation may be uniformly applied upon an aluminum-PET or a PET carrier, leveled to a thickness of about 50 micrometers and cured for approximately 10 minutes at 120-130° C.

In another step, the results of which are shown in FIG. 3C, an additional layer 58, referred to as a compliance layer, is applied to layer 56, on the side opposite to ink-transfer surface 54. Compliance layer 58 is an elastomeric layer which allows layer 56 and its outermost surface 54 to follow closely the surface contour of a substrate onto which an ink image is impressed. The attachment of compliance layer 58 to the side opposite to ink-transfer surface 54 may involve the application of an adhesive or bonding composition in addition to the material of compliance layer 58. Compliance layer 58 may typically have a thickness of between about 100 micrometers and about 300 micrometers or more. Adhesive layers, if present, are typically no more than 100 micrometers thick, and more typically no more than 20 micrometers thick.

Compliance layer 58 may have the same composition as that of release layer 56, but typically is selected to have different mechanical properties (e.g., greater resistance to tension). Such desired differences in properties may be achieved by varying the proportions between the ingredients used to prepare the formulation of release layer 56 and/or by the addition of further ingredients to such formulation and/or by the selection of different curing conditions and such modifications. For instance, the addition of filler particles may favorably increase the mechanical strength of compliance layer 58 relative to release layer 56. Alternatively, compliance layer 58 may have a different composition to that of release layer 56. For instance, the compliance layer 58 can be made of alkyl acrylate copolymer rubbers (ACM), methyl vinyl silicone rubber (VMQ), ethylene propylene diene monomer rubber (EPDM), fluoroelastomer polymers, nitrile butadiene rubber (NBR), ethylene acrylic elastomer (EAM), and hydrogenated nitrile butadiene rubber (HNBR).

As a non-limiting example, Silopren® LSR 2530 (Momentive Performance Materials Inc.), a two-component liquid silicone rubber, in which the two components are mixed at a 1:1 ratio, was applied to the cured release layer 56 previously described. The silicone rubber mixture was metered/leveled with a knife blade to obtain an incipient compliance layer 58 having a thickness of about 250 micrometers, which was then cured for approximately 5 minutes at 150-160° C.

In another step, the results of which are shown in FIG. 3D, a support layer 60 is constructed on the compliance layer 58 on which a fiber reinforcement, in the form of a web or a fabric, is disposed, to provide the support layer 60 with sufficient structural integrity to withstand stretching when the ITM is held in tension in a printing system. The support layer 60 is formed by coating the fiber reinforcement with a resin that is subsequently cured and remains flexible after curing.

Alternatively, support layer 60 may be separately formed as a reinforcement layer, comprising such fibers embedded and/or impregnated within the independently cured resin. In such case, support layer 60 may be attached to compliance layer 58 via an adhesive layer, optionally eliminating the need to cure the support layer 60 in situ. Generally, support layer 60, whether formed in situ on compliance layer 58 or separately, may have a thickness of between about 100 micrometers and about 500 micrometers, part of which is attributed to the thickness of the fibers or the fabric which generally varies between about 50 micrometers and about 200 micrometers. However, for heavy-duty applications or for other types of multi-layered articles the support layer can have a thickness of more than 200 micrometers, more than 500 micrometers, or 1 mm or more.

For example, to the multi-layered structure described herein, comprising a vinyl-functionalized release layer 56 and a two-components silicone rubber compliance layer 58, was applied a support layer 60 comprising woven fabric of glass fibers. The glass fiber fabric, having a thickness of about 100 micrometers, was a plain weave fabric having 16 yarns/cm in both perpendicular directions. It was embedded into a curable fluid comprising a liquid silicone rubber Silopren® LSR 2530 corresponding to the compliance layer. Overall, the resulting support layer 60 had a thickness of about 200 micrometers and was cured at 150° C. for approximately 2-5 minutes.

Following the in situ formation or attachment of the support layer 60, additional layers can be built up on the reverse side of the support layer 60 as required. In FIG. 3E, a thick felt blanket 62 is secured by a cured adhesive or resin to the reverse side of the support layer 60, and in FIG. 3F, a high friction material 64 is coated onto the reverse side of the felt blanket 62. As will be appreciated by persons skilled in the art, various relatively soft rubbers may serve for the preparation of a layer having high friction properties, silicone elastomers being but an example of such rubbers.

As mentioned, all layers (e.g., 58, 60, 62, 64, or any intervening adhesive or priming layer and the like) added to the release layer of the ITM are said to jointly form the base of the structure, as illustrated by base 32 in FIG. 2.

Though not shown in the drawings, one may attach to the support layer 60 along its two edges two fabric strips, each resembling one half of a zip fastener. The teeth or formations on these strips are intended to be gripped in channels as the ITM passes through certain positionally critical regions of the printing system to maintain the ITM under lateral tension. Similarly one may attach to the ends of the multi-layered strip means enabling the two ends to be joined to form a continuous looped belt.

Before the ITM is used, it is necessary to remove carrier 50 (including its contact surface 52), to expose ink-transfer surface 54 of release layer 56, as illustrated in FIG. 3G. The finished product can simply be peeled from carrier 50 and in the case of an ITM, the fact that release layer 56 may be somewhat hydrophobic will enable the ITM to separate easily from carrier 50 without damage to ink-transfer surface 54. For example, a 100 μm thick siloxane layer may be peeled off a PET foil using a linear peel force smaller than 50 grams/centimeter (g/cm), in some embodiments smaller than 20 g/cm, smaller than 10 g/cm, smaller than 5 g/cm, smaller than 3 g/cm, or even smaller than 2 g/cm. The linear peel force may be applied and measured in any desired direction with respect to the line of contact between the surfaces being peeled apart, for example along a line normal to the contacting front of the two surfaces. It should be readily appreciated by the person skilled in the art that such a low force is much lower than the tear strength of a PET foil, even at a thickness as low as 12 μm. Likewise, such a low force as may be required for peeling is much lower than the tear strength of a sufficiently cured siloxane layer, even at a release layer thickness as low as 100 μm and even without any further enforcement of a base layer. Thus, when an ITM, including a release layer and a base layer is manufactured, supported on a polymer carrier such as PET or polyimide foil according to the teachings herein, peeling the ITM from the carrier (or vice versa) may readily be done without damaging the release layer and preferably without damaging the carrier.

If the carrier 50 is a flexible foil, it may be preferred to leave it in place on the ITM until such time as the ITM is to be installed into a printing system. The foil will act to protect the ink-transfer layer 54 of the ITM during storage, transportation and installation. Additionally, carrier 50 can be replaced, following completion of the manufacturing process, by an alternative foil able to serve as a protective film.

It is furthermore possible to use the carrier 50 to help in the installation of the ITM in the printing system by providing on it attachment points to assist in pulling the ITM around its desired path in the printing system.

FIG. 4 and FIGS. 5A to 5C schematically illustrate an apparatus 100 in which the present method for manufacturing a self-supporting strip can be implemented, according to some embodiments. FIG. 4 provides a schematic overview of such an apparatus 100 with one or more casting stations 110, such as layer casting stations 110a and 110b. Casting station 110 is configured for forming a layer of a curable fluid composition on a carrier, and then curing the layer. Forming the layer may be done, for example, by dispensing the fluid composition on the carrier and possibly levelling the layer prior to curing.

Figure 5B:
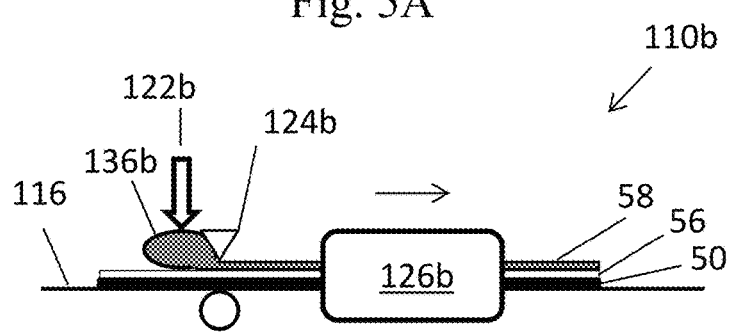
Figure 5C:
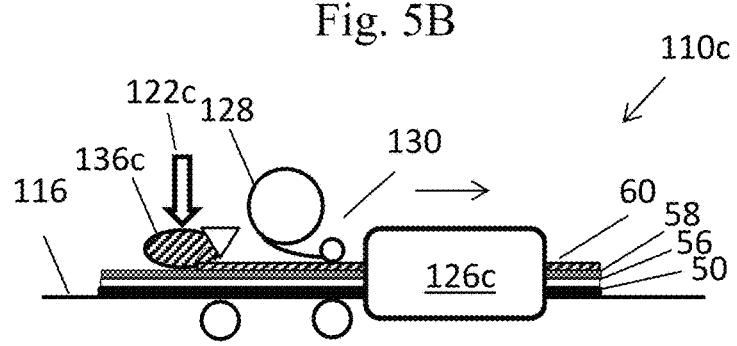

Apparatus 100 further comprises an unwinding roller 112 and a winding roller 114 moving a flexible conveyer 116 through layer casting stations 110a and 110b. According to some embodiments flexible conveyer 116 may serve to support and drive carrier 50 as schematically illustrated in FIGS. 5A-5C. In some such applications the conveyer is a looped conveyer, having a section (not depicted here) returning from winding roller 114 towards unwinding roller 112. In some embodiments, carrier 50 is directly tensioned between rollers 112 and 114 as is schematically illustrated in FIG. 4. Unprocessed carrier 50 is unwound from unwinding roller 112, and after passing through stations 110a and 110b, is rewound onto winding roller 114.

Layer casting station 110a comprises a dispensing station 122a, able to dispense curable fluid compositions suitable for the desired multi-layered articles, a leveling station 124a, able to control the thickness of the curable layer as it moves downstream of the station, and a curing station 126a, able to at least partially cure the layer enabling it to serve as incipient layer for a subsequent step, if any. The dispensing station 122a, the leveling station 124a and the curing station 126a can be suitably positioned along the path followed by carrier 50 (or conveyer 116). Likewise, layer casting station 110b of apparatus 100 may optionally include dispensing station 122b, leveling station 124b and curing station 126b. Furthermore, layer casting station 110 may include additional sub-stations, illustrated by a dispensing roller 128 in station 110a.

It is noted that according to some embodiments, the configuration depicted in FIG. 4 wherein unprocessed carrier 50 is unwound from unwinding roller 112, and then the processed carrier 50 is rewound onto winding roller 114, is advantageous, for potentially providing carrier 50 with a clean, substantially contaminants-free carrier contact surface 52. A suitable carrier, such as e.g., a commercially available PET sheet, may be provided having been rolled on unwinding roll 112 during manufacturing, in a substantially clean environment. Hence carrier contact surface 52 may be exposed to the ambient in apparatus 100 as unwinding roll 112 unwinds, substantially immediately prior to the dispensing of the curable fluid compositions in dispensing station 122a. Consequently, the incipient release layer, formed on the surface of the curable fluid composition layer facing the carrier after curing, may be substantially free of defects (such that are caused by air-carried contaminants).

Additionally or alternatively, apparatus 100, or parts thereof where such concern may exist, can be operated in a clean environment to further reduce the possible exposure of the carrier contact surface to contaminants and/or the development of defects on the surface coating. Additionally or alternatively, a cleaning station (not depicted here) may also be employed upstream of the dispensing station for cleaning the carrier contact surface 52 just prior to dispensing, to ensure or to maintain a contaminants-free carrier contact surface 52 and hence a substantially defect-free release layer.

Additionally or alternatively with regard to contaminants, contaminants such as dust, dirt and/or other minute debris on the carrier contact surface 52 may be removed by the application of the curable composition 136a of release layer 56, the fluid being typically capable of engulfing the contaminants, if any.

Thus, the absence of contaminants on a surface of a multi-layer article may be indicative of the process used for its preparation. As contaminants may settle on articles following their manufacture, any assessment of the presence of such contaminants should be preceded by cleaning of the surface of the article to be studied. Such cleaning can include, for instance, peeling off of surface contaminants with an adhesive tape and rinsing of the surface with alcohol (e.g., ethanol, isopropanol etc.). The surface of an article prepared according to the present teachings, the surface having faced a carrier during its at least partial curing, shall be substantially free of contaminants (e.g., dust, dirt, and other minute debris) following such cleaning. This is in contrast with multi-layer articles whose outer surface is prepared facing an air interface (e.g., bottom-up), which despite such pre-cleaning may retain contaminants on their surface, either on account of their exposure to such particles during their manufacturing, or of their chemical composition (e.g., unable to dissociate from dust, dirt and other minute debris), or both.

Though not illustrated in the figure, the apparatus may further include upstream of the dispensing station a "surface treatment" station facilitating the subsequent application of a curable composition, or its attachment to the carrier contact surface or incipient layer as the case may be. As mentioned in relation with the carrier, the optional surface treatment station (not shown) can be suitable for physical treatment (e.g., corona treatment, plasma treatment, ozonation, etc.).

FIG. 5A schematically illustrates how in a casting station 110a of apparatus 100, a carrier 50 placed on conveyor 116 can be coated. At dispensing station 122a, the curable composition 136a of release layer 56 is applied to carrier contact surface 52. As carrier 50 is driven in the direction of the arrow, the curable composition 136a is leveled to a desired thickness at leveling station 124a, for instance, by using a doctor blade. As the leveled layer proceeds downstream, it enters curing station 126a, configured so as to at least partially cure curable composition 136a, enabling the formation of incipient layer 56 at the exit side of the curing station. Such exemplary steps have been described in connection with FIGS. 3A and 3B.

FIGS. 5B and 5C schematically illustrate how additional layers (forming the base) can be applied. In FIG. 5B, a curable composition 136b is dispensed upon release layer 56 at dispensing station 122b (the release layer 56 having been at least partially cured as explained above). Curable composition 136b is leveled to a desired thickness at leveling station 124b, then enters curing station 126b, and exits curing station 126b sufficiently cured to serve as incipient layer 58 for a subsequent step, and so on. Such an exemplary step has been described in connection with FIG. 3C.

FIG. 5C schematically depicts a curable composition 136c being applied to layer 58 at dispensing station 122c. A backbone of a support layer (e.g., a fabric) can be delivered by dispensing roller 128. The exemplary fabric can be submerged into the curable composition 136c at a station 130 prior to their entry into curing station 126c. In such a manner, a support layer 60 can be formed at the exit side of the curing station 126c.

It is noted that, according to some embodiments, a single layer-casting station 110 may be employed to sequentially form the layers of the self-supported strip as described above. For example, apparatus 100 of FIG. 4 may be employed with only one layer-casting station 110a, whereas the processed strip is passed sequentially, time after time, through the casting station to build-up the strip one layer at a time. First, an unprocessed carrier roll may be loaded to the unwinding roller 112 of the apparatus and tensioned between unwinding roller 112 and winding roller 114. Then the release layer may be formed on the carrier as described above in FIG. 5A. When the processed carrier has been coated with the release layer 56 to the entire length of the carrier sheet, and the processed carrier has been accordingly wound on winding roller 114, the roll of processed carrier may be taken off winding roller 114 and may be loaded again onto unwinding roller 112. Then the processed carrier may be tensioned between unwinding roller 112 and winding roller 114 as described above, and a next layer 58 may be applied thereon, as illustrated in FIG. 5B. By sequentially repeating the steps of loading a processed carrier on unwinding roller 112 and then casting a new layer thereupon, a strip as described above, including the said release layer, and any layer of the base and possibly yet additional layers of the base, may be constructed. This method can be viewed as a cyclic roll-to-roll manufacturing method, the number of cycles depending on the number of layers to be formed for the self-supported strip.

The finished article comprises the carrier and, disposed thereon, the self-supported strip, generally comprising several layers, at least the surface coating or release layer of the said first curable material and the base layer. According to some embodiments, the finished strip (that is the self-supported strip attached to the carrier) may be further processed following the layer manufacturing described above. For example, an elongated strip of the finished article may be looped so as to connect the two opposing ends of the strip to one another thereby producing a looped belt (or a looped ITM for a printing machine).

There is thus provided according to an aspect of the invention a method of manufacturing a self-supported strip having an at least partially cured surface coating. The method comprises:
a. providing a fluid first curable material configured to be at least partially cured by a curing process;
b. providing a carrier having a carrier contact surface, the carrier contact surface being wettable by the fluid first curable material, the carrier being configured to maintain structural integrity when subject to the curing process;
c. forming a layer of the fluid first curable material on the carrier contact surface, with one side of the layer contacting the carrier contact surface, by applying the fluid first curable material onto the carrier, so that the fluid first curable material wets the carrier contact surface;
d. at least partially curing the fluid first curable material to form the at least partially cured surface coating of the self-supported strip; and
e. securing a flexible base to, or forming a flexible base on, a surface of the at least partially cured surface coating opposite the carrier.

The at least partially cured surface coating, together with the flexible base, are peelable from the carrier, to produce the self-supported strip.

According to some embodiments, the at least partially cured surface coating of the self-supported strip is hydrophobic. According to some embodiments, the fluid first curable material has a lower surface energy than the carrier contact surface. According to some embodiments, the carrier fluid first curable material is viscous, thereby wetting the carrier contact surface.

According to some embodiments, the polymeric surface comprises polar or functional groups having at least one free electron pair. According to some embodiments, the polymeric surface comprising, or consisting essentially of, a polymer selected from the group consisting of polyesters, polyfluorocarbons and polyimides. According to some embodiments, the polymeric surface comprises, or consists essentially of polyethylene terephthalate (PET). According to some embodiments, the polymeric surface comprises or consists of polytetrafluoroethylene (PTFE). According to some embodiments, the polymeric surface comprises, or consists of poly (4,4'-oxydiphenylene-pyromellitimide) (Kapton®).

According to some embodiments, the forming of the incipient release layer of the fluid first curable material comprises depositing the layer of the fluid first curable material onto the carrier contact surface thereby forming the incipient release layer. According to some embodiments, the depositing of the layer of the fluid first curable material onto the carrier contact surface comprises pouring the fluid first curable material onto the carrier contact surface.

According to some embodiments, the thickness of the incipient release layer is such that when substantially fully cured, the resulting surface coating or release layer is not less than 2 μm and not more than 200 μm thick. According to some embodiments, the variance of thickness of the fluid first curable material is such that when substantially fully cured, the variance of thickness of the resulting surface coating or release layer is within 5 μm, or within 2 μm, or within 1 μm, or within 0.5 μm, or within 0.2 μm of a predetermined thickness. According to some embodiments, the variance of thickness of the fluid first curable material is such that when substantially fully cured, the variance of thickness of the resulting surface coating or release layer is within 20%, or within 15%, or within 10%, or within 5% of a predetermined thickness. According to some embodiments, the forming of the layer of the fluid first curable material, the thickness of the formed layer of the fluid first curable material is mechanically adjusted while the first curable material is still fluid.

According to some embodiments, the method further comprises applying heat to the layer of the fluid first curable material, thereby increasing a rate of curing thereof. According to some embodiments, the method further comprises irradiating by UV or eBeam irradiation the layer of the fluid first curable material, thereby increasing a rate of curing thereof.

According to some embodiments, the fluid first curable material comprises a polyurethane polymer. According to some embodiments, the fluid first curable material comprises a silicone polymer. According to some embodiments, the fluid first curable material comprises a vinyl-terminated silicone polymer. According to some embodiments, the fluid first curable material comprises a vinyl-functionalized silicone polymer. According to some embodiments, the fluid first curable material comprises a heat-curable addition cure silicone polymer.

According to some embodiments, the step of forming the flexible base on a surface of the at least partially cured surface coating opposite the carrier, comprises forming a layer of a fluid second curable material on the surface of the at least partially cured surface coating, the layer of the fluid second curable material constituting an incipient layer forming at least part of the base of the self-supported strip. According to some embodiments, the method further comprises at least partially curing the layer of the second curable material, thereby forming at least part of the base of the self-supported strip. According to some embodiments, the thickness of the layer of the fluid second curable material is such that when substantially fully cured, the resulting support layer is not less than 100 μm and not more than 500 μm thick.

According to some embodiments, the layer of the fluid second curable material is formed while the layer of the first curable material is still fluid.

According to some embodiments, the forming the layer of the fluid second curable material comprises:
after the layer of the first curable material is at least partially cured to an extent so as to be no longer fluid:
optionally applying a primer layer to the layer of the at least partially cured first curable material and
depositing the fluid second curable material on the primer layer or on the layer of the at least partially cured first curable material, thereby forming the layer of the fluid second curable material.

According to some embodiments, the primer layer having a thickness of not less than 1 μm and not more than 50 μm. According to some embodiments, the depositing of the fluid second curable material is by pouring the fluid second curable material onto the primer layer or onto the at least partially cured first curable material layer. According to some embodiments, the fluid second curable material comprises a solid reinforcement material (e.g., fibers optionally as a fabric). According to some embodiments, the fluid second curable material comprises the solid reinforcement material prior to the forming of the layer of the fluid second curable material. According to some embodiments, the method further comprises subsequently to the forming the layer of the fluid second curable material and while the second curable material is still fluid, embedding a solid reinforcement material in the layer of the fluid second curable material. According to some embodiments, the method further comprises subsequently to the forming the layer of the fluid second curable material and while the second curable material is still fluid, placing a solid reinforcement material on an exposed surface of the layer of the fluid second curable material. According to some embodiments, the securing of a flexible base to the surface of the at least partially cured surface coating opposite the carrier further comprises:
providing a sheet constituting an incipient layer forming at least part of the base of the self-supported strip, and
contacting the sheet to the surface of the at least partially cured surface coating, thereby securing the flexible base to the surface of the at least partially cured surface coating.

According to some embodiments, the contacting is while the layer of the first curable material is still fluid.

According to some embodiments, the method further comprises:
applying an adhesive layer to the layer of the first curable material after the layer of the first curable material cures to an extent so as to be no longer fluid; and
contacting the sheet with the adhesive layer thereby securing the flexible base to the surface of the at least partially cured surface coating.

According to some embodiments, the adhesive layer having a thickness of not less than 1 μm and not more than 50 μm. According to some embodiments, the sheet comprises embedded solid reinforcement material. According to some embodiments, the solid reinforcement material comprises fibers. According to some embodiments, the fibers capable of providing the reinforcement have a thickness of not less than 50 μm and not more than 200 μm. According to some embodiments, the fibers constitute a fabric. According to some embodiments, the fabric has a thickness of not less than 50 μm and not more than 200 μm. According to some embodiments, the fibers are of a material selected from the group consisting of organic fibers, meta-aramid, para-aramid, polyamide, nylon fibers, polyester fibers, high density polyethylene fibers, natural fibers, cotton fibers, inorganic fibers, glass fibers, carbon-fiber fibers, ceramic fibers, metal fibers and combinations thereof. According to some embodiments, the fibers are surface-treated fibers, which surface treatment increases adhesion of the fibers to vinyl silanes. According to some embodiments, the fibers are oriented fibers.

According to some embodiments, the method further comprises, subsequently to 'e', finishing manufacture of the self-supported strip without separating the release layer from the carrier.

According to some embodiments, the finishing manufacture includes forming at least one additional layer that constitutes a portion of the base. According to some embodiments, the finishing manufacture includes adding lateral projections to lateral edges of the self-supported strip.

According to some embodiments, the method further comprises, subsequently to 'e', packaging the self-supported strip without separating the release layer from the carrier.

According to some embodiments, the method further comprises joining two opposite ends of the self-supported strip to form a continuous looped belt.

According to some embodiments, the self-supported strip is an intermediate transfer member (ITM) for use in an indirect printing system. According to some embodiments, the at least partially cured surface coating is an at least partially cured release layer defining an outer ink-transfer surface of the ITM.

There is further provided according to an aspect of the invention a method of mounting an intermediate transfer member (ITM) on, or into, an indirect printer. The method comprises:
providing the self-supported strip, the self-supported strip being an ITM prepared as described above, while the release layer is still in contact with the carrier;
mounting the provided self-supported strip, with the carrier, on, or into, an indirect printer; and
subsequently to the mounting, separating the carrier from the release layer.

According to a further aspect of the invention there is provided a method of mounting an intermediate transfer member (ITM) on, or into, an indirect printer, which comprises:

providing the self-supported strip, the self-supported strip being an ITM prepared as herein described while the release layer is still in contact with the carrier;

separating the carrier from the release layer; and mounting the provided self-supported strip on, or into, an indirect printer, the mounting being optionally performed within 1 hour from the separating.

According to yet a further aspect of the invention, there is provided a method of determining a surface energy of an at least partially cured surface coating of a self-supported strip. The method comprises:

providing a fluid first curable material having a surface energy $E_0$ when cured interfacing with air;

providing a carrier having a carrier contact surface, having a surface energy $E_2$, wherein $E_2$ is different from $E_0$.

forming a layer of the fluid first curable material on the carrier contact surface, with one side of the layer contacting the carrier contact surface, by applying the fluid first curable material onto the carrier;

at least partially curing the fluid first curable material to form the at least partially cured surface coating of the self-supported strip, wherein the at least partially cured surface coating and the carrier are peelable from one another; and detaching the at least partially cured surface coating from the carrier.

The method thereby produces the self-supported strip, having a surface coating with a pre-determined surface energy $E_1$, different from $E_0$. According to some embodiments the surface energy $E_2$ of the carrier contact surface is higher than the surface energy $E_0$ of the cured material when cured in air, namely the carrier contact surface tends to be more hydrophilic than the cured material when cured in air. According to some such embodiments, the surface energy $E_1$ of the surface coating $E_0 < E_1 \leq E_2$.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

For instance, while features such as smoothness and/or waviness of a surface, presence or absence of defects on an at least partially cured layer, and density of defects as a function of the orientation of a layer of fluid curable material during curing have been detailed separately, a method according to the present teachings may enable a combination of such features and/or an article manufactured by said method may display a combination of at least two desired structural features.

By way of non-limiting example, and considering for simplicity a resulting self-supported strip article and for brevity only one of the possible characteristics of each feature, the layer at least partially cured in contact with a carrier surface or its surface distal from the flexible base may (as measured following peeling of the carrier) display the following behaviors:

a) the surface may have an average roughness Ra of no more than 250 nm and may be substantially devoid of bubble-generated protrusions and/or craters;

b) the surface may have an average roughness Ra of no more than 250 nm and may be substantially devoid of contaminants (as measured following cleaning);

c) the surface may have an average roughness Ra of no more than 250 nm, may be substantially devoid of bubble-generated protrusions and/or craters, and may be substantially devoid of contaminants (as measured following cleaning);

d) the surface may have an average roughness Ra of no more than 250 nm and may be substantially devoid of bubble-generated protrusions and/or craters, the layer may be further characterized by an increasing density of bubble-generated protrusions and/or craters from the one side which had contacted the carrier contact surface prior to the peeling to the opposite side proximal to the base (as measured on a cross-section);

e) the surface may have an average roughness Ra of no more than 250 nm and may be substantially devoid of contaminants (as measured following cleaning), the layer may be further characterized by an increasing density of contaminant-generated defects from the one side which had contacted the carrier contact surface prior to the peeling to the opposite side proximal to the base (as measured on a cross-section);

f) the surface may have an average roughness Ra of no more than 250 nm, may be substantially devoid of bubble-generated protrusions and/or craters, and may be substantially devoid of contaminants (as measured following cleaning), the layer may be further characterized by an increasing density of defects due to bubbles and/or contaminants from the one side which had contacted the carrier contact surface prior to the peeling to the opposite side proximal to the base (as measured on a cross-section);

g) the surface may have an average roughness Ra of no more than 250 nm and may be substantially devoid of defects, the layer may be further characterized by an increasing density of defects from the one side which had contacted the carrier contact surface prior to the peeling to the opposite side proximal to the base (as measured on a cross-section);

h) etc.

Although the present invention has been described with respect to various specific embodiments presented thereof for the sake of illustration only, such specifically disclosed embodiments should not be considered limiting. Many other alternatives, modifications and variations of such embodiments will occur to those skilled in the art based upon Applicant's disclosure herein. Accordingly, it is intended to embrace all such alternatives, modifications and variations and to be bound only by the spirit and scope of the invention as defined in the appended claims and any change which comes within their meaning and range of equivalency.

To the extent necessary to understand or complete the disclosure of the present invention, all publications, patents, and patent applications mentioned herein, are expressly incorporated by reference in their entirety as is fully set forth herein.

Citation or identification of any reference in this application shall not be construed as an admission that such reference is available as prior art to the invention.

Certain marks referenced herein may be common law or registered trademarks of third parties. Use of these marks is by way of example and shall not be construed as descriptive or limit the scope of this invention to material associated only with such marks.

The invention claimed is:

1. A self-supported strip, comprising a fully cured surface coating and a base, wherein said fully cured surface coating in said self-supported strip is a release layer having an outer release surface, the release layer having an average roughness (Ra) of at most 250 nm on the outer release surface; and having a surface energy $E_1$ on the outer release surface that is greater than a surface energy $E_0$ on an opposite side of the release layer facing the base;
   wherein any defects present in the release layer have a decreasing defect density from a side of the release layer which faces the base to an opposite side of the release layer forming the outer release surface.

2. The self-supported strip of claim 1, wherein the self-supported strip is an intermediate transfer member (ITM) suitable for use in an indirect printing system.

3. The self-supported strip of claim 1, wherein the outer release surface of the self-supported strip is hydrophobic.

4. The self-supported strip of claim 1, wherein the outer release surface of the self-supported strip comprises a cured vinyl-functionalized silicone polymer.

5. The self-supported strip of claim 1, wherein the base includes two or more layers.

6. The self-supported strip of claim 1, wherein the base includes a fiber reinforcement.

7. The self-supported strip of claim 1, further including lateral projections to lateral edges of said self-supported strip.

8. The self-supported strip of claim 1, wherein the base is a flexible base, and wherein said self-supported strip was produced by a method comprising:
   a. providing a fluid first curable material configured to be at least partially cured by a curing process;
   b. providing a carrier having a carrier contact surface, said carrier contact surface being wettable by said fluid first curable material, said carrier being configured to maintain structural integrity when subject to said curing process;
   c. forming a layer of said fluid first curable material on said carrier contact surface, with one side of said layer contacting said carrier contact surface, by applying said fluid first curable material onto said carrier, so that said fluid first curable material wets said carrier contact surface;
   d. at least partially curing said fluid first curable material to form an at least partially cured surface coating of the self-supported strip;
   e. securing a flexible base to, or forming a flexible base on, a surface of the at least partially cured surface coating opposite said carrier; and
   f. peeling said at least partially cured surface coating together with said flexible base from said carrier, wherein said at least partially cured surface coating is post-cured to yield the fully cured surface coating prior to or subsequent to said peeling.

9. The self-supported strip of claim 1, wherein the outer release surface of the self-supported strip comprises a cured polyurethane polymer.

10. The self-supported strip of claim 1, wherein the outer release surface of the self-supported strip comprises a cured silicone polymer.

11. A self-supported strip, comprising a fully cured surface coating and a base, wherein said fully cured surface coating in said self-supported strip is a release layer having an outer release surface, the release layer having an average roughness (Ra) of at most 250 nm on the outer release surface; and having a surface energy $E_1$ on the outer release surface that is greater than a surface energy $E_0$ on an opposite side of the release layer facing the base; the self-supported strip further including a peelable flexible foil carrier having a carrier contact surface contacting the outer release surface; and wherein any defects present in the release layer have a decreasing defect density from a side of the release layer which faces the base to an opposite side of the release layer forming the outer release surface.

12. The self-supported strip of claim 11, wherein said Ra is at most 10 nm.

13. The self-supported strip of claim 11, wherein the carrier contact surface has a surface energy between 20 and 70 mJ/m².

14. The self-supported strip of claim 11, wherein the carrier contact surface comprises a surface selected from the group consisting of a metal surface and a metal oxide surface, the metal surface or metal oxide surface being part of a metal foil or of a metalized polymer foil.

15. The self-supported strip of claim 11, wherein the carrier contact surface includes a polymeric surface, comprising, or consisting essentially of, a polymer selected from the group consisting of polyesters, poly-fluorocarbons and polyimides.

16. The self-supported strip of claim 11, wherein said Ra is at least 3 nm.

17. A self-supported strip, comprising a fully cured surface coating and a base, wherein said fully cured surface coating in said self-supported strip is a release layer having an outer release surface, the release layer having an average roughness (Ra) of at most 250 nm on the outer release surface; and having a surface energy $E_1$ on the outer release surface that is greater than a surface energy $E_0$ on an opposite side of the release layer facing the base;
   wherein said outer release surface is substantially free of defects, wherein said substantially free of defects is quantified by less than 0.01% of said outer release surface being covered by said defects;
   and wherein any defects present in the release layer have a decreasing defect density from a side of the release layer which faces the base to an opposite side of the release layer forming the outer release surface.

18. The self-supported strip of claim 17, wherein said Ra is at most 25 nm.

19. The self-supported strip of claim 17, wherein said Ra is at most 10 nm.

20. The self-supported strip of claim 19, wherein said Ra is at least 3 nm.

* * * * *